(12) United States Patent
Fujinaga

(10) Patent No.: US 9,098,781 B2
(45) Date of Patent: Aug. 4, 2015

(54) PRINTING APPARATUS FOR MOVING A PRINT CARRIAGE AND WRITING TAG INFORMATION IN A WIRELESS TAG ON A PAPER SHEET

(71) Applicant: CANON KABUSHIKI KAISHA, Tokyo (JP)

(72) Inventor: Seiya Fujinaga, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/309,295

(22) Filed: Jun. 19, 2014

(65) Prior Publication Data
US 2015/0002865 A1  Jan. 1, 2015

(30) Foreign Application Priority Data

Jun. 28, 2013  (JP) ................. 2013-137480

(51) Int. Cl.
*G06K 15/02* (2006.01)
(52) U.S. Cl.
CPC ...... *G06K 15/021* (2013.01); *H04N 2201/0081* (2013.01); *H04N 2201/0094* (2013.01)
(58) Field of Classification Search
USPC ............................... 358/1.5, 1.15
See application file for complete search history.

(56) References Cited

U.S. PATENT DOCUMENTS

| 2006/0139662 | A1* | 6/2006 | Sugiyama | 358/1.5 |
| 2009/0207002 | A1* | 8/2009 | Maruo et al. | 340/10.51 |
| 2009/0231600 | A1* | 9/2009 | Hashimoto | 358/1.5 |
| 2012/0224223 | A1* | 9/2012 | Yamamoto | 358/1.15 |

FOREIGN PATENT DOCUMENTS

| JP | 2007-50992 A | 3/2007 |
| JP | 2007-105889 A | 4/2007 |
| JP | 2010-9556 A | 1/2010 |

OTHER PUBLICATIONS

U.S. Appl. No. 14/339,842, filed Jul. 24, 2014. Applicant: Seiya Fujinaga.

* cited by examiner

*Primary Examiner* — Qian Yang
(74) *Attorney, Agent, or Firm* — Fitzpatrick, Cella, Harper & Scinto

(57) ABSTRACT

A printing apparatus includes a print carriage incorporating a printhead and a communication unit configured to perform short distance wireless communication, and a conveyance unit configured to convey the print carriage. When conveying the print carriage to cause the printhead to execute printing of print data, the printing apparatus detects a wireless tag on a paper sheet using the communication unit, and writes tag information in the detected wireless tag. The printing apparatus changes the conveyance mode of the print carriage by the conveyance unit before and after the number of wireless tags detected on the paper sheet reaches the number of target wireless tags in which tag information is to be written.

18 Claims, 17 Drawing Sheets

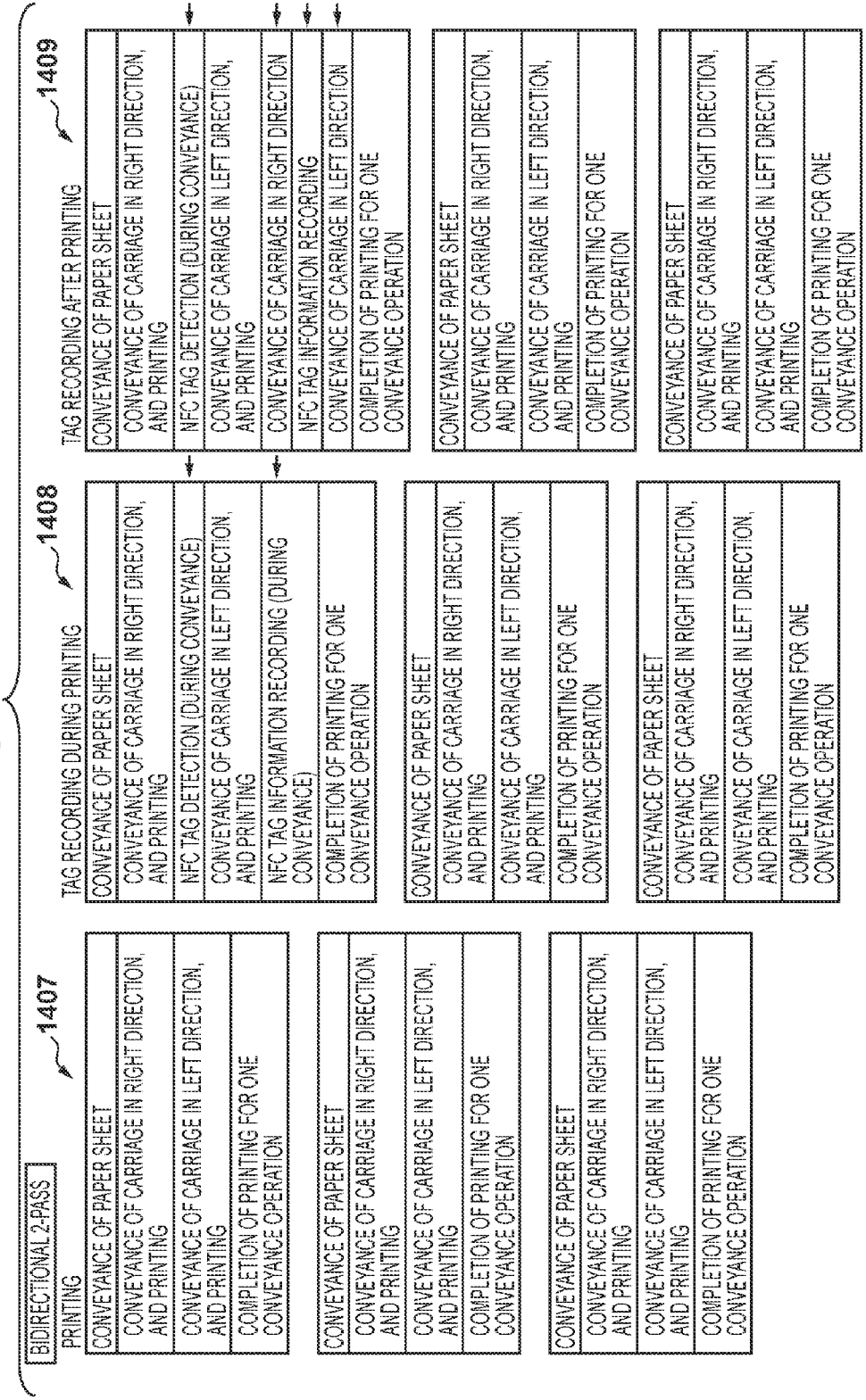

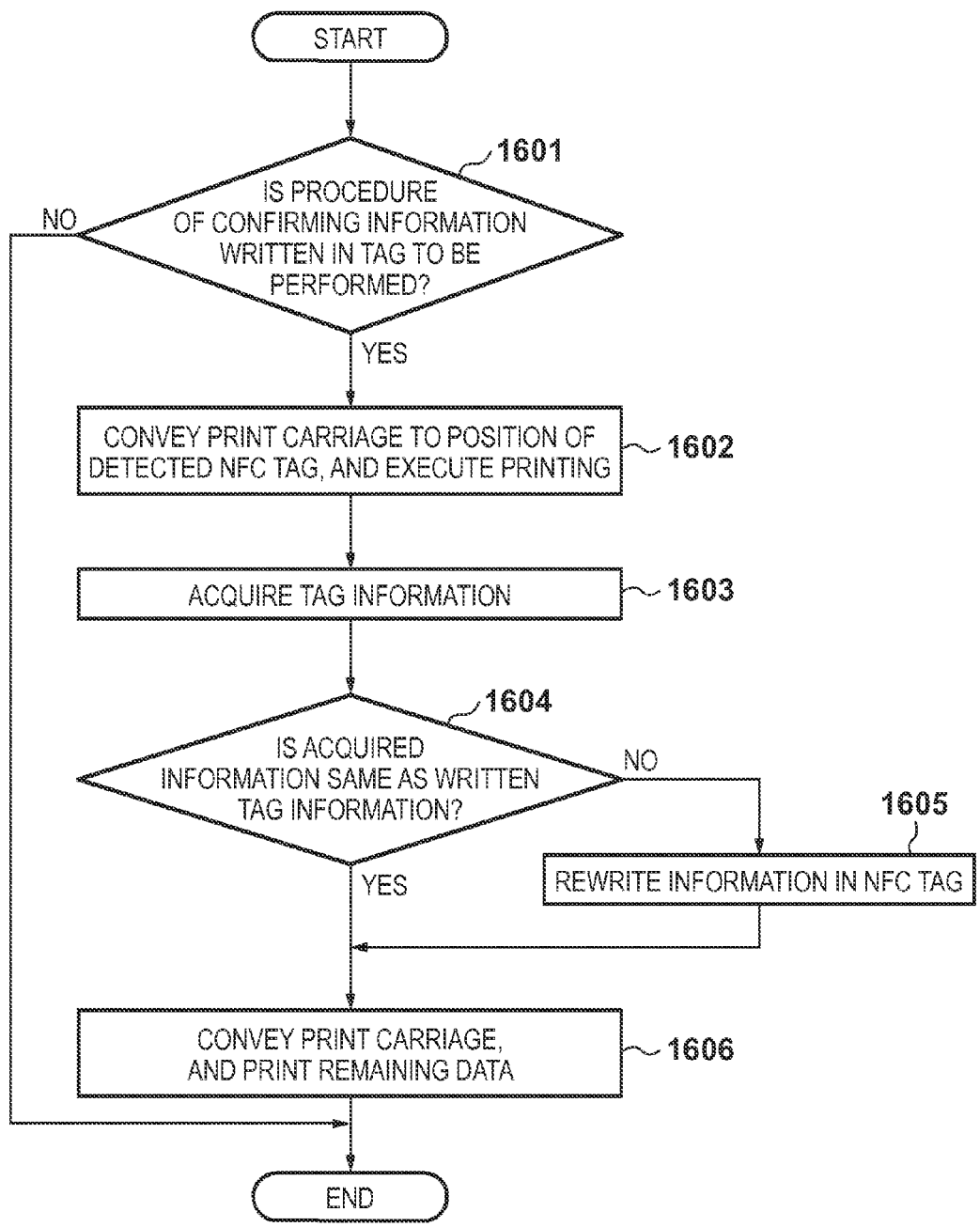

PRINTING APPARATUS FOR MOVING A PRINT CARRIAGE AND WRITING TAG INFORMATION IN A WIRELESS TAG ON A PAPER SHEET

BACKGROUND OF THE INVENTION

1. Field of the Invention

The present invention relates to a printing apparatus and a control method therefor.

2. Description of the Related Art

Along with development of the communication technology, short distance wireless communication is becoming the mainstream as communication between a printing apparatus and a portable communication terminal apparatus. There are various use cases in which, for example, authentication is performed by actually using short distance wireless communication. In particular, as a use method of short distance wireless communication in a printing apparatus, there have been proposed various applications and methods, in addition to communication with a portable communication terminal apparatus.

For example, Japanese Patent Laid-Open No. 2007-105889 discloses a method in which a printing apparatus records, in a wireless tag included in a paper sheet, information indicating whether the tag is included on the obverse surface or reverse surface. In Japanese Patent Laid-Open No. 2007-050992, a unit configured to detect the size of a paper sheet at an antenna level when tag information embedded in the paper sheet is read at the sheet feed port of a printing apparatus is adopted. Furthermore, in Japanese Patent Laid-Open No. 2010-009556, an attempt is made to deal with a delay of information by acquiring print data from a main board by short distance communication when the head of an inkjet printer executes printing.

In the methods described in the above patent literatures, however, if the position of a wireless tag in the paper sheet is unknown at the time of recording information in the wireless tag included in the paper sheet, it is necessary to search the entire paper sheet to detect the wireless tag. Therefore, a structure for detecting a tag in an apparatus needs to be considered according to the paper sheet. Furthermore, if the paper size exceeds the detection range of short distance wireless communication, it is required to incorporate a plurality of communication units. As a result, it is difficult to freely arrange a tag for wireless communication on the paper sheet. In addition, detection of a wireless tag reduces the print speed.

SUMMARY OF THE INVENTION

According to an embodiment of the present invention, there are disclosed a printing apparatus and a control method therefor, which suppress a decrease in print speed due to a search for a wireless tag while allowing a wireless tag to be freely arranged on a paper sheet.

According to one aspect of the present invention, there is provided a printing apparatus comprising: a print carriage incorporating a printhead and a communication unit configured to perform short distance wireless communication; a movement control unit configured to move the print carriage; a detection unit configured to detect, when the movement control unit moves the print carriage to cause the printhead to execute printing of print data, a wireless tag on a paper sheet using the communication unit; a write unit configured to write tag information in the wireless tag detected by the detection unit; and a control unit configured to change a moving mode of the print carriage by the movement control unit before and after the number of wireless tags detected by the detection unit reaches the number of target wireless tags which are targets of write processing by the write unit.

According to another aspect of the present invention, there is provided a control method for a printing apparatus which includes a print carriage incorporating a printhead and a communication unit configured to perform short distance wireless communication, and a movement control unit configured to move the print carriage, the method comprising: a detection step of detecting, when the movement control unit moves the print carriage to cause the printhead to execute printing of print data, a wireless tag on a paper sheet using the communication unit; a write step of writing tag information in the wireless tag detected in the detection step; and a control step of changing a moving mode of the print carriage by the movement control unit before and after the number of wireless tags detected in the detection step reaches the number of wireless tags which are targets of write processing in the write step.

Further features of the present invention will become apparent from the following description of exemplary embodiments with reference to the attached drawings.

BRIEF DESCRIPTION OF THE DRAWINGS

FIGS. 14A to 14C are views for explaining print carriage conveyance and conveyance control for tag detection;

FIG. 16 is a flowchart illustrating processing of confirming written tag information.

DESCRIPTION OF THE EMBODIMENTS

An embodiment of the present invention will be described below with reference to the accompanying drawings. Note that the relative arrangement of the respective components of an apparatus, the shape of the apparatus, and the like, which are used in this embodiment, are merely examples. The present invention is not limited to them as long as it is implemented by an arrangement having the same effects. Note that in this embodiment, a term "conveyance" is used for the operation of a print carriage such as print scanning. However, this term indicates the movement of the print carriage. Therefore, "conveyance control", "conveyance mode", "during conveyance", and "conveyance speed" of the print carriage can be interpreted as "movement control", "moving mode", "during movement", and "moving speed" of the print carriage, respectively.

In this embodiment, a method of communicating with a medium (to be referred to as a wireless tag hereinafter) included in a paper sheet to be printed by using a short distance wireless communication method in a printing apparatus while performing printing will be described. A method of controlling a print carriage in the printing apparatus at that time will also be explained. Especially, as a practical example of this embodiment, a multi-function printer (to be referred to as an MFP hereinafter) capable of copying a poster, a photo, or the like attached with a wireless tag in which information has been recorded will be exemplified. By implementing, by an MFP, an arrangement to be described in this embodiment, it becomes possible to copy a photo, a poster, or the like with a wireless tag. Note that in the following description, NFC is used as a short distance wireless communication method and an NFC tag is used as a wireless tag. The communication method, however, is not limited to this.

Figure 1:
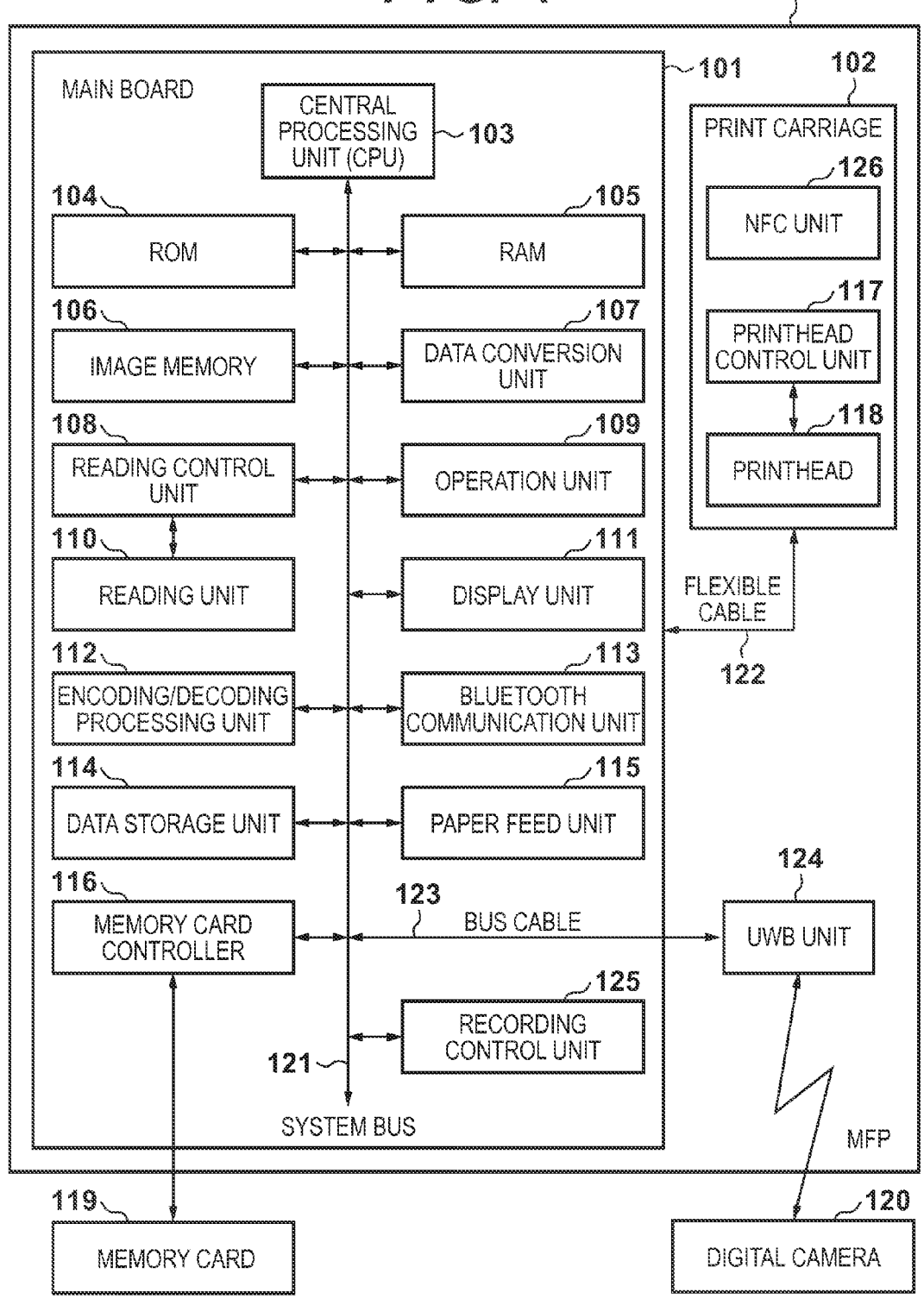
FIG. 1 is a block diagram showing an example of the arrangement of a printing apparatus.

FIG. 1 is a block diagram showing the schematic arrangement of an MFP 100. The MFP 100 includes a main board 101 for executing main control of the apparatus, a print carriage 102 for receiving print data and controlling discharge of ink, and a UWB unit 124 for performing data communication with another device such as a digital camera.

In the main board 101, a CPU 103 is a system control unit, and controls the overall MFP 100. A ROM 104 stores control programs to be executed by the CPU 103, an embedded operating system (OS) program, and the like. In this embodiment, the respective control programs stored in the ROM 104 execute software control such as scheduling and task switching under the management of the embedded OS stored in the ROM 104. A RAM 105 is implemented by an SRAM (Static RAM) or the like, stores program control variables and the like, also stores setting values registered by the user, management data of the MFP 100, and the like, and is allocated with various work buffer areas. An image memory 106 is implemented by a DRAM (Dynamic RAM) or the like, and stores image data received via the UWB unit 124, those processed by an encoding/decoding processing unit 112, and those acquired via a memory card controller 116.

A data conversion unit 107 executes analysis of a page description language (PDL) and the like, conversion from image data into print data, and the like. A reading control unit 108 controls a reading unit 110 for optically reading a document by a CIS image sensor (contact type image sensor), thereby obtaining an image signal as electrical image data. Furthermore, the reading control unit 108 performs, via an image processing control unit (not shown), various kinds of image processing such as binarization processing and halftone processing for the image signal, thereby outputting the obtained image signal as high resolution image data. Note that in this embodiment, the reading control unit 108 is compatible with both a sheet reading control method of reading a document while conveying it and a book reading control method of scanning a document placed on a document table. In this embodiment, the reading unit 110 can acquire tag information of a document. In this embodiment, there exists an NFC communicable wireless tag on a document, and a reading apparatus which can also read information of the NFC communication tag is additionally prepared in the reading unit 110. This arrangement enables the reading unit to read image information on a document and information of an NFC tag on the document.

An operation unit 109 is arranged on an interface panel 700, and used by the user to decide image print data, set registration values, and perform a data setting registration operation. A display unit 111 is formed by an LED (Light Emitting Diode), an LCD (Liquid Crystal Display), and the like. Using the above components makes it possible to perform various input operations, and display operation states, status conditions, and the like of the MFP 100.

The encoding/decoding processing unit 112 executes encoding/decoding processing and enlargement/reduction processing for image data (MH, MR, MMR, JBIG, JPEG, or the like) handled by the MFP 100. A Bluetooth® communication unit 113 controls communication by Bluetooth, and includes a communication I/F control unit, a baseband unit, an RF unit, and an antenna. This allows the MFP 100 to perform communication complying with the Bluetooth communication standard.

A data storage unit 114 is a memory for storing data. In this embodiment, since no data backup area is prepared in the image memory 106, the data storage unit 114 is prepared as a data saving area. Note that the memory structure in the MFP 100 is not limited to above-described one. For example, the data storage unit 114 and the image memory 106 may be implemented by a single memory. Furthermore, a digital image or the like may be saved in the data storage unit 114, and used for printing. Although a DRAM is used as the image memory 106 in this embodiment, a hard disk, a nonvolatile memory, or the like may be used.

A paper feed unit 115 holds paper sheets for printing, and feeds a paper sheet to a recording unit for performing printing by print scanning of the print carriage 102 under the control of a recording control unit 125. Note that a plurality of paper feed units 115 may be included so as to hold a plurality of types of paper sheets, and the recording control unit 125 may control to select a paper feed unit to be used to feed paper sheets. The paper feed unit 115 includes a paper width detection unit capable of detecting the width of a sheet to be fed. The recording control unit 125 can execute printing control using paper width information detected by the paper width detection unit at the time of printing.

When a memory card is inserted, the memory card controller 116 transmits/receive data in the memory card via a protocol complying with the USB communication standard. The USB communication standard is a standard which allows high speed bidirectional data communication, and also allows connection of a plurality of hubs or functions (slaves) to one host (master). A memory card 119 serves as a data storage medium, and can connect to the memory card controller 116 of the MFP 100. The memory card 119 can save image data and other electronic data.

The print carriage 102 includes a printhead control unit 117 and a printhead 118. The printhead 118 executes printing on a paper sheet while the print carriage 102 moves in the main scanning direction, thereby performing a print operation. The printhead control unit 117 receives print data from the recording control unit 125 via a flexible cable 122, and controls ink to be discharged from the printhead 118 in accordance with the received data.

The UWB unit 124 serves as a communication unit for performing data communication with another device such as a digital camera 120. The UWB unit 124 converts data into packets to transmit the packets to another device. The UWB unit 124 also converts packets from another external device into data to transmit the data to the CPU 103. The UWB unit 124 is connected to a system bus 121 via a bus cable 123.

The recording control unit 125 performs, via the image processing control unit (not shown), various kinds of image processing such as smoothing processing, recording density correction processing, and color correction for image data to be printed, converts the resultant data into high resolution image data, and outputs the obtained image data to the printhead control unit 117. The recording control unit 125 also serves to periodically acquire the state information of the printhead control unit 117 by controlling it.

An NFC unit 126 is a unit capable of performing short distance communication. In this embodiment, the NFC unit 126 is mounted on the print carriage 102. As the print carriage 102 is conveyed at the time of printing, the NFC unit 126 also moves. Furthermore, if the NFC unit 126 is arranged at a distance of several cm from a print sheet, and the paper sheet is attached with a wireless tag (NFC tag) usable in short distance communication, the NFC unit 126 can perform communication.

The above respective components 103 to 109, 111 to 116, and 125 are connected to each other via the system bus 121 managed by the CPU 103. In this embodiment, it is possible to read a document using the reading unit 110 and the reading control unit 108, and save image data in the data storage unit 114 via the data conversion unit 107. After that, an image data print instruction can be issued by an operation through the operation unit 109. Upon receiving the print instruction, the CPU 103 can convert data using the recording control unit 125, and print the data by the print carriage 102.

Figure 2:
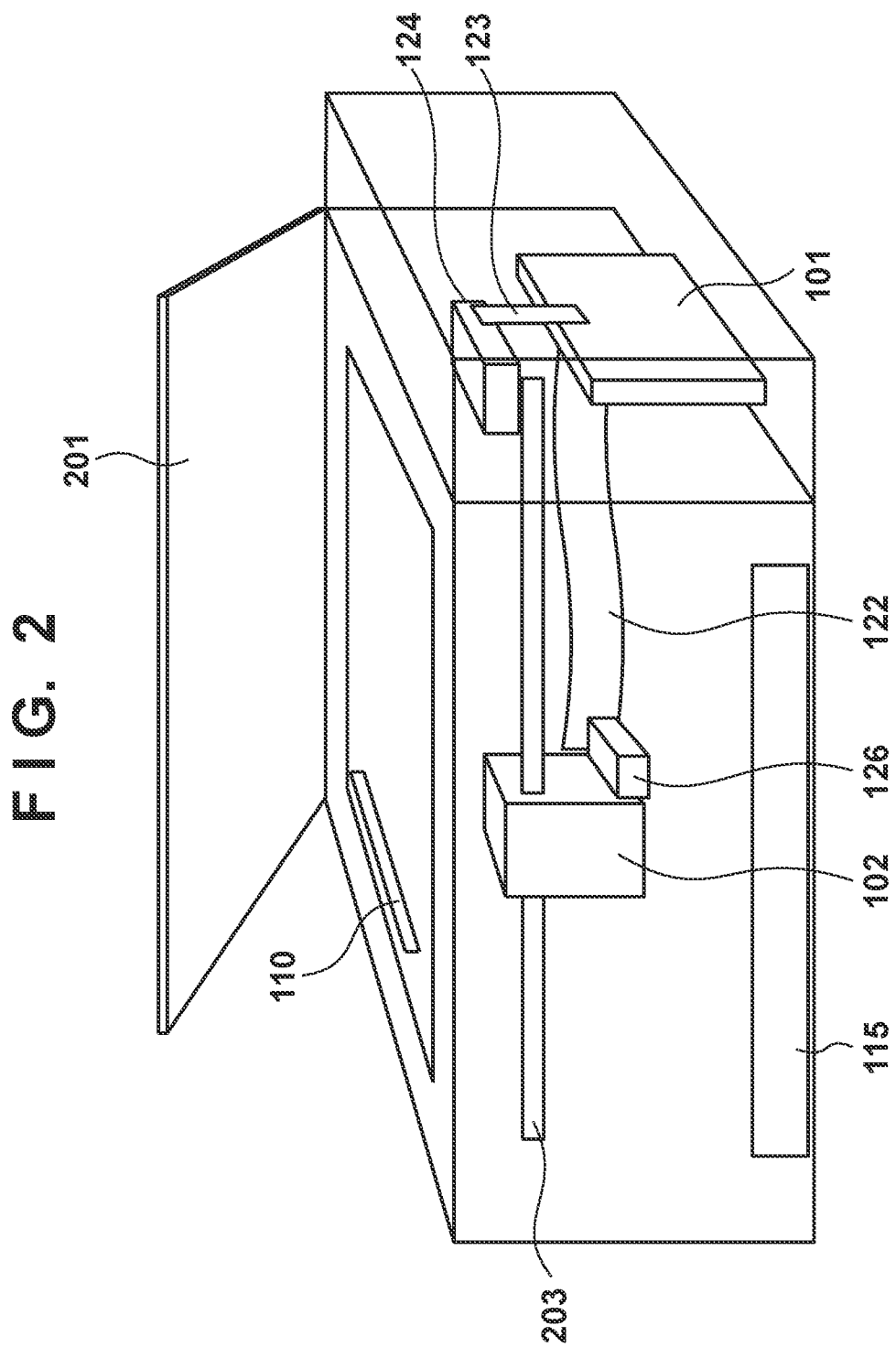
FIG. 2 is a view for explaining the outer appearance and internal structure of the printing apparatus.

FIG. 2 is a perspective view showing the outer appearance and internal arrangement of the MFP 100. The main board 101 is attached to the right side of the housing of the MFP. The flexible cable 122 connecting the main board 101 and the print carriage 102 transmits print data. The flexible cable 122 can transmit/receive data even while the print carriage 102 reciprocates along a shaft 203. A document is set on the reading unit 110, and is read after closing a document cover 201. The reading unit 110 has an arrangement for reading tag information from an NFC tag on the read document, and can acquire the tag information and image data of the document attached with the NFC tag. The printhead 118 and the NFC unit 126, which are mounted on the print carriage 102, can print and record the read image data and tag information on and in a fed paper sheet. Note that in this embodiment, an NFC tag is also included in a paper sheet to be printed. In this case, the NFC tag in the paper sheet to be printed need not be arranged at the same location as that of the NFC tag existing in the document. With an arrangement according to the embodiment to be described below, it is possible to freely arrange an NFC tag in a paper sheet to be printed.

Figure 3A:
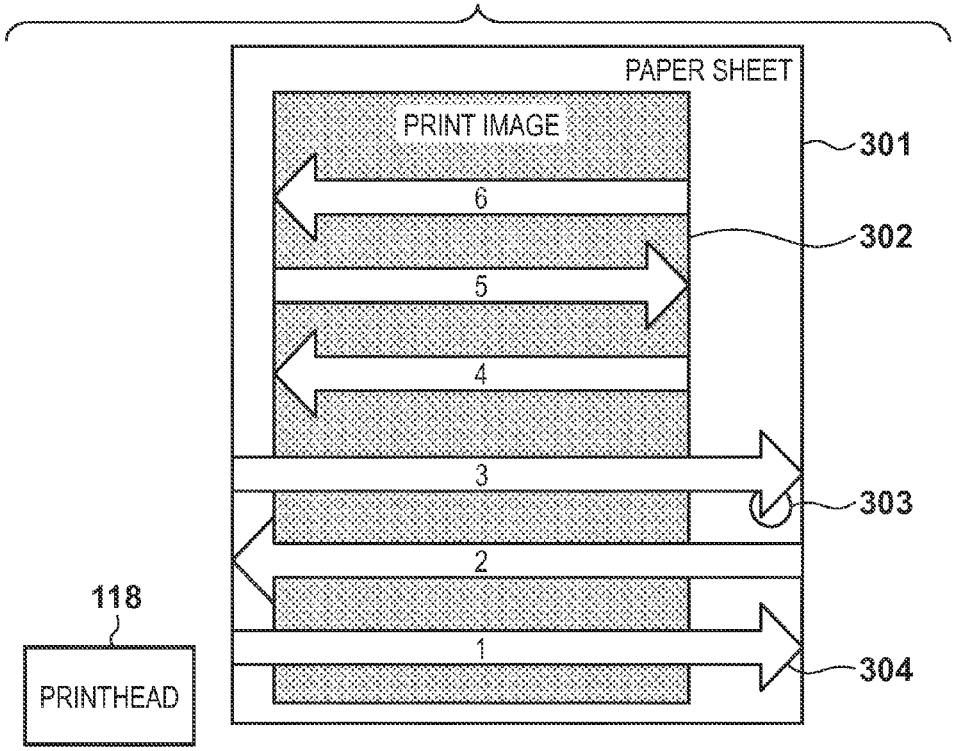
FIGS. 3A and 3B are views for explaining the conveyance mode of a print carriage.
Figure 3B:
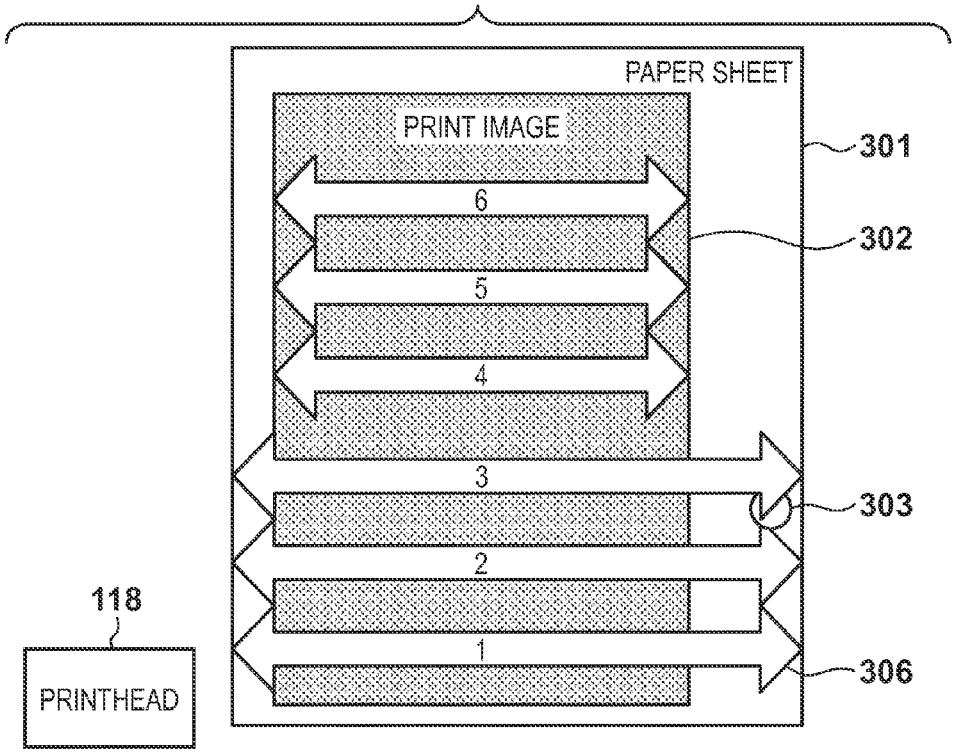

FIGS. 3A and 3B are views for explaining the conveyance mode of the print carriage, which is implemented in this embodiment. FIG. 3A shows the conveyance mode of the print carriage at the time of 1-pass printing in which one conveyance operation from left to right (or from right to left) completes printing for a line. FIG. 3B shows the conveyance mode of the print carriage at the time of 2-pass printing in which printing for a line is completed by bidirectionally conveying the print carriage twice. FIGS. 3A and 3B each show a case in which the conveyance mode is changed before and after an NFC tag 303 is detected. That is, before detection of the NFC tag 303, the print carriage 102 scans a width (the full width of a paper sheet) corresponding to a NFC tag search range on the paper sheet. After detection of the NFC tag 303, the print carriage 102 scans a width corresponding to the printing range of print data (image printing width).

In both the 1-pass printing method and the 2-pass printing method, switching the conveyance mode makes it possible to obtain effects of detecting the arbitrarily arranged NFC tag 303 and preventing the print speed from lowering, as described above. Note that FIGS. 3A and 3B show examples of 1-pass printing and 2-pass printing, respectively. It is possible to obtain the same effects irrespective of the number of passes. The present invention never depends on the number of passes.

Referring to FIGS. 3A and 3B, reference numeral 301 denotes a paper sheet used in printing; and 302, a region where a print image is to be printed on the paper sheet. This region indicates not a printable range but a region where printing is actually performed. The width or length of the region changes depending on an image to be printed. The NFC tag 303 can perform short distance wireless communication. The NFC tag 303 is a tag attached to the paper sheet 301, and can communicate with the NFC unit 126. Note that in this embodiment, no power is supplied to the paper sheet, and thus the NFC unit 126 and the NFC tag 303 communicate with each other in a passive mode. Note that the passive mode will be described in detail with reference to FIG. 5.

Reference numeral 304 schematically denotes a direction in which the printhead 118 is conveyed by the print carriage 102, and its conveyance length. FIG. 3A shows that the print carriage 102 conveys the printhead 118 by a width indicated by an arrow. In this example, three arrows 1 to 3 in the lower portion of FIG. 3A each indicate that the print carriage 102 is conveyed by the paper width. On the other hand, three arrows 4 to 6 in the upper portion of FIG. 3A each indicate that the print carriage is conveyed by the image width. In FIG. 3A, as an image of printing, printing is performed from the lower portion of the paper sheet 301. Since no NFC tag is found first, the print carriage is conveyed by the paper width. Subsequently, the NFC tag 303 is found in the third conveyance operation. After that, the print carriage is conveyed by only the width of the image data. In this way, changing conveyance of the print carriage after detecting the NFC tag makes it possible to maintain the print speed as much as possible and perform printing at the same time while searching for an NFC tag whose location on the paper sheet is unknown. That is, when copying a document with an NFC tag, it is possible to perform print control without decreasing the speed as much as possible.

FIG. 3B shows the same effects. Unlike the pass direction 304 shown in FIG. 3A, a head pass direction 306 indicates two directions, and thus indicates that the print carriage 102 is conveyed twice by the same head width. After the NFC tag 303 is found in the third conveyance operation, however, conveyance of the print carriage 102 is limited to that by the image width.

Figure 4:
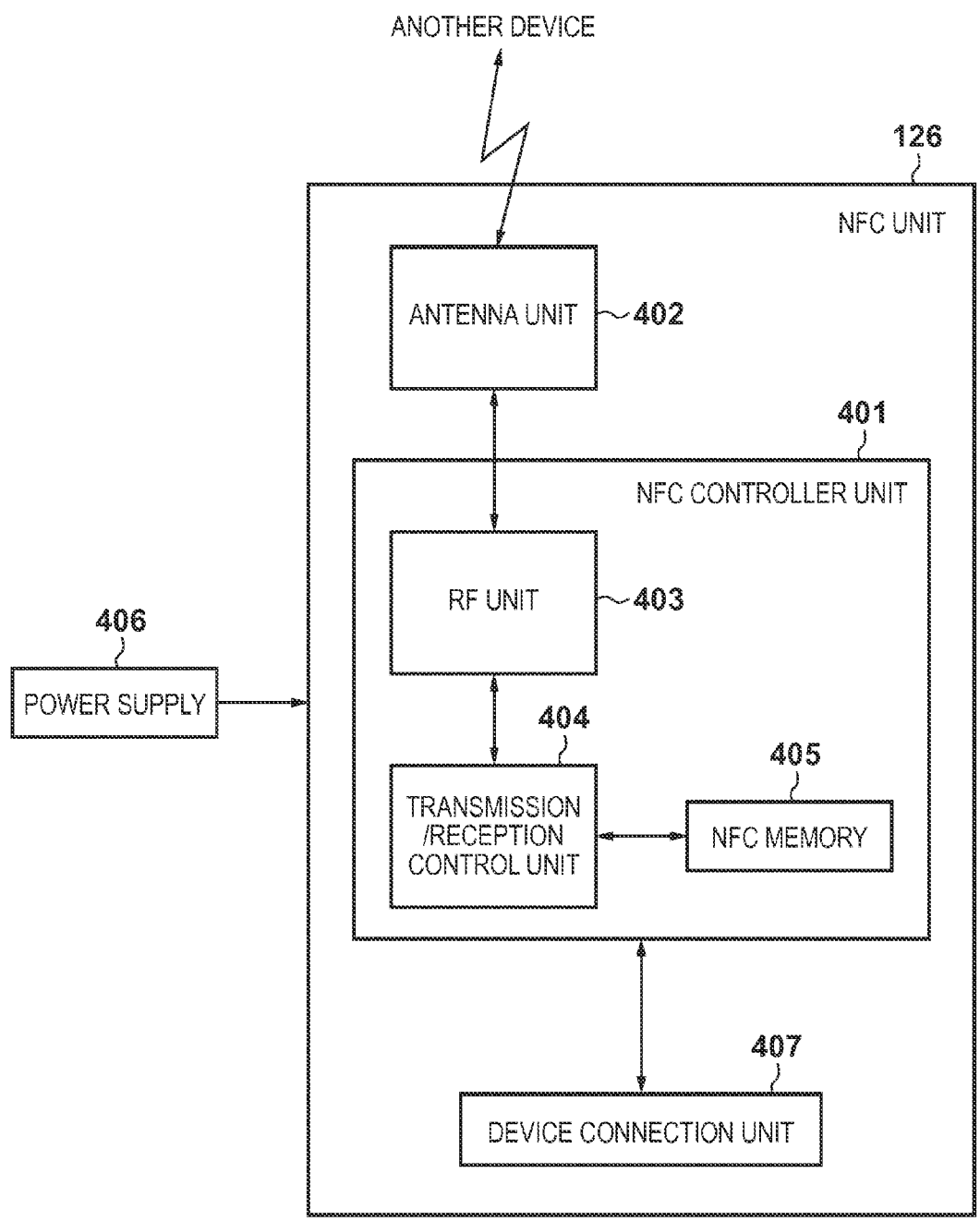
FIG. 4 is a block diagram showing an example of the arrangement of an NFC unit.

FIG. 4 is a block diagram for explaining details of the NFC unit 126. The NFC unit 126 includes an NFC controller unit 401, an antenna unit 402, an RF unit 403, a transmission/reception control unit 404, an NFC memory 405, and a device connection unit 407, and receives power from a power supply 406. The antenna unit 402 receives radio waves and carriers from another NFC device, and transmits radio waves and carriers to another NFC device. The RF unit 403 has a function of modulating/demodulating an analog signal to a digital signal. The RF unit 403 includes a synthesizer, and controls bands and channels based on frequency assignment data by identifying the frequencies of the bands and channels. The transmission/reception control unit 404 executes control associated with transmission/reception, such as assembling and disassembling of a transmission/reception frame, appending and detection of a preamble, and identification of a frame. The transmission/reception control unit 404 also controls the NFC memory 405 to read out/write various data and programs.

When the NFC unit operates in an active mode, it receives power via the power supply 406 to communicate with a device via the device connection unit 407 and to communicate with another NFC device located within a communicable range by carriers transmitted/received via the antenna unit 402. When the NFC unit operates in the passive mode, it receives carriers from another NFC device via the antenna to receive power from the other NFC device by electromagnetic induction, and transmits/receives data by performing communication with the other NFC device by modulating carriers.

NFC communication will now be described. An apparatus which starts communication by outputting an RF (Radio Frequency) field when performing close proximity communication by an NFC unit will be referred to as an initiator. An apparatus which communicates with the initiator in response to an instruction issued by the initiator will be referred to as a target. The communication mode of the NFC unit includes a passive mode and active mode. In the passive mode, a target responds to an instruction of an initiator by performing load modulation. On the other hand, in the active mode, a target responds to an instruction of an initiator by an RF field generated by the target itself.

Figure 5:
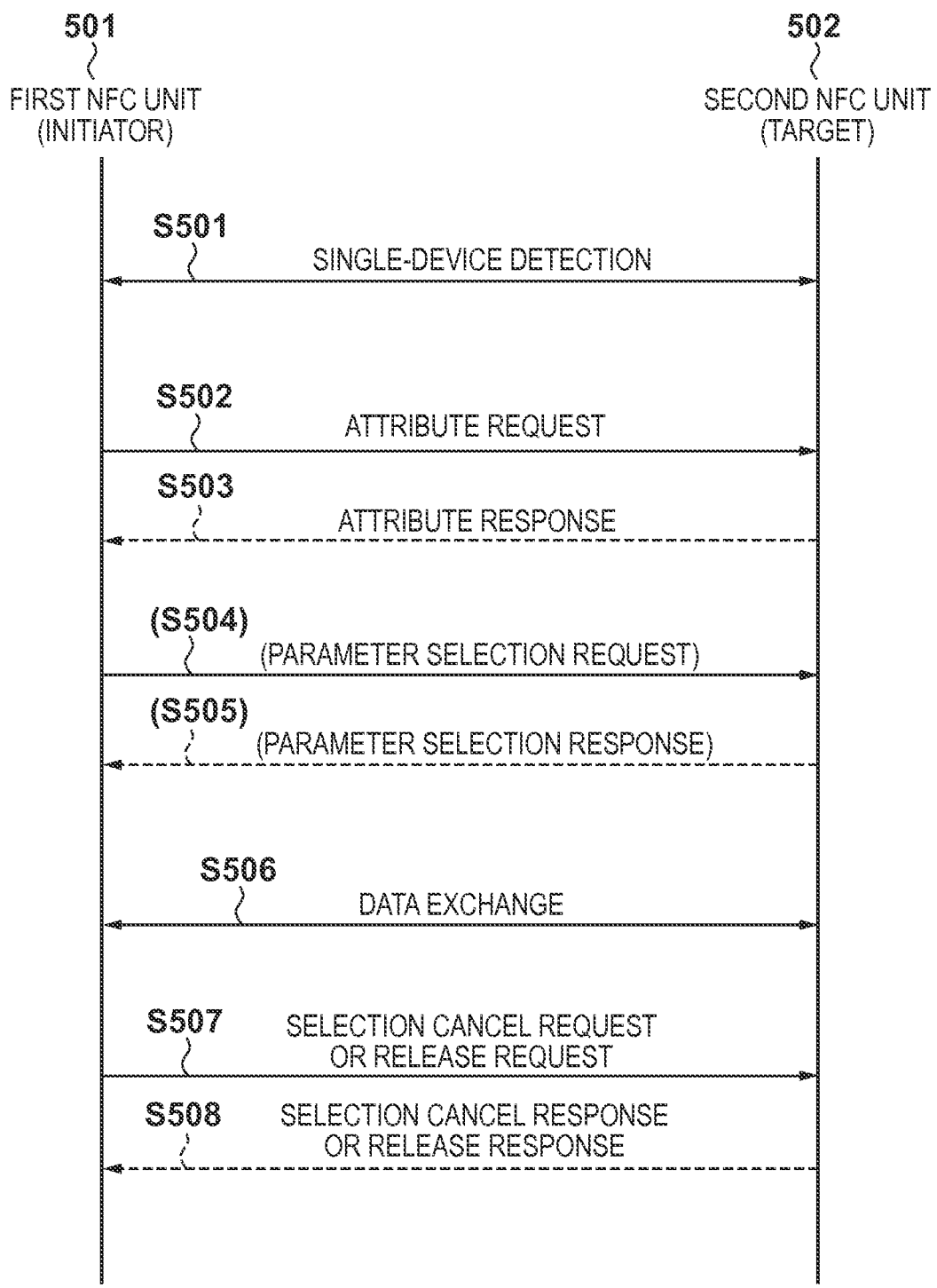
FIG. 5 is a sequence chart showing an NFC communication sequence in a passive mode.

FIG. 5 shows a sequence of performing data exchange in the passive mode. A case will now be described in which a first NFC unit 501 is operating as an initiator, and a second NFC unit 502 is operating as a target.

In step S501, the first NFC unit 501 performs single-device detection and specifies the second NFC unit 502. In step S502, the first NFC unit 501 transmits the identifier of its own, the bit transmission rate of transmission/reception, the effective data length, and the like as an attribute request. The attribute request has general purpose bytes which can be arbitrarily selected and used. Upon receiving an effective attribute request, the second NFC unit 502 transmits an attribute response in step S503. Transmission from the second NFC unit 502 is done by load modulation. Data transmission by load modulation is represented by a dotted arrow in FIG. 5.

After confirming an effective attribute response, the first NFC unit 501 can change the parameters of a subsequent transmission protocol by transmitting a parameter selection request in step S504. Parameters included in the parameter selection request are the transmission rate and the effective data length. Upon receiving an effective parameter selection request, the second NFC unit 502 transmits a parameter selection response in step S505, thereby changing the parameters. Note that steps S504 and S505 may be omitted if the parameter change is not to be performed.

In step S506, the first NFC unit 501 and the second NFC unit 502 exchange data by a data exchange request and a data exchange response. At the time of transmitting the data exchange request and the data exchange response, information for an application of the communication partner or the like can be transmitted as data. If the data size is large, the data can be divisionally transmitted.

Upon completion of data exchange, the process advances to step S507, and the first NFC unit 501 transmits one of a selection cancel request and a release request. When the first NFC unit 501 transmits the selection cancel request, the second NFC unit 502 transmits a selection cancel response in step S508. Upon receiving the selection cancel response, the first NFC unit 501 releases the attributes representing the second NFC unit 502, and the process returns to step S501. On the other hand, when the first NFC unit 501 transmits the release request, the second NFC unit 502 transmits a release response in step S508, thereby returning to the initial state. Upon receiving the release response, the first NFC unit 501 may return to the initial state because the target has been completely released.

Figure 6:
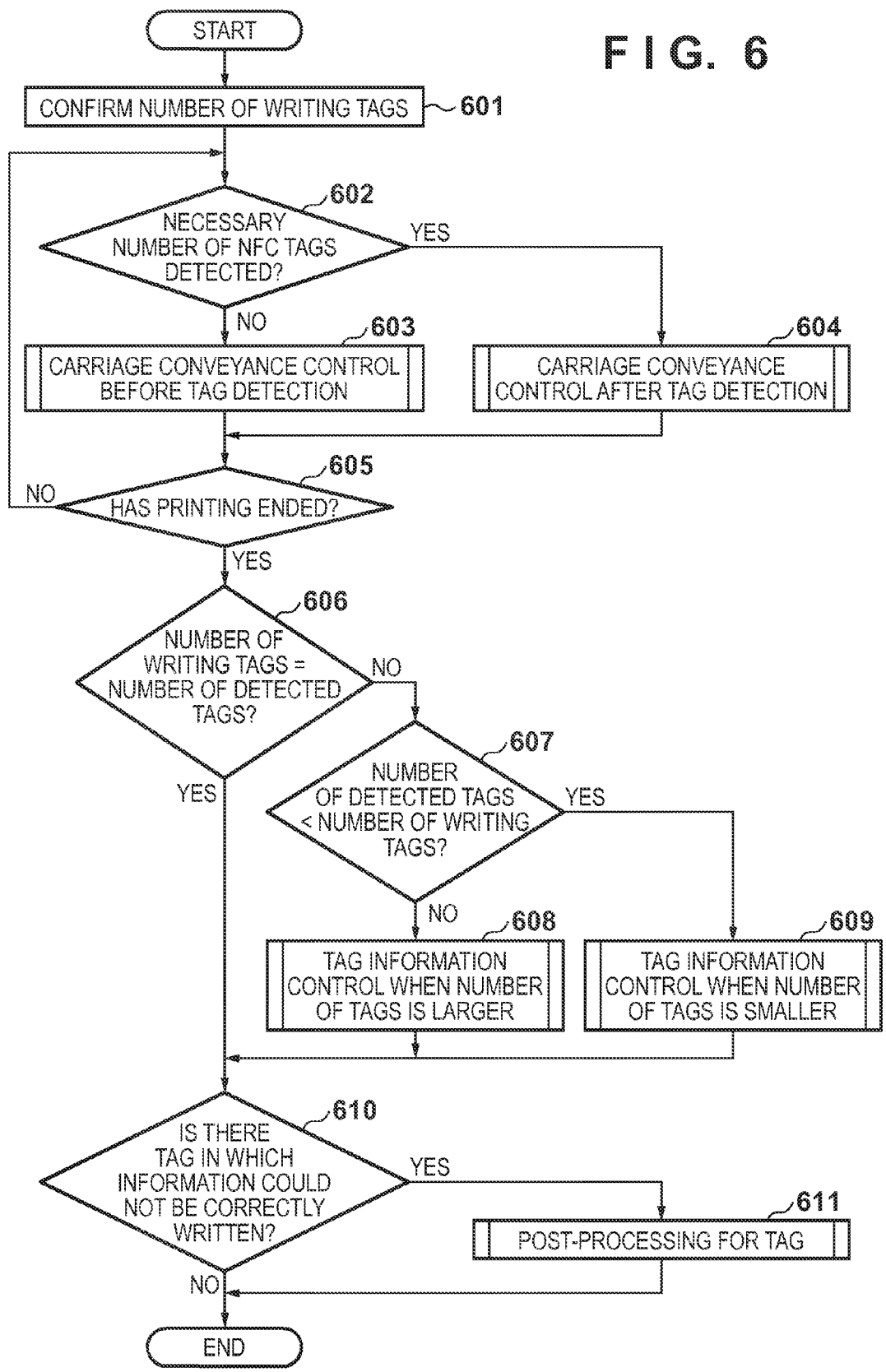
FIG. 6 is a flowchart for explaining conveyance control of the print carriage and recording of information in a tag.

An example of conveyance control of the print carriage 102 and recording of tag information in an NFC tag at the time of executing printing will be described with reference to FIG. 6. FIG. 6 shows a procedure of simultaneously performing printing and recording of information in an NFC tag by mounting the NFC unit 126 on the print carriage 102. Note that FIG. 6 shows a procedure after the start of printing.

In step 601, the CPU 103 confirms the number of tags in a read document. For example, the reading unit 110 reads a document placed on the document table, and also reads NFC tag information on the document. With this operation, the reading unit 110 acquires the number of NFC tags on the document and the tag information as well as an image on the document. The CPU 103 confirms the number of NFC tags acquired by the reading unit 110.

In step 602, the CPU 103 compares the number of NFC tags confirmed in step 601 with that of NFC tags detected so far on a print sheet. If the number of detected NFC tags has not reached that of NFC tags existing on the read document, the process advances to step 603. In step 603, the CPU 103 executes conveyance control of the print carriage before NFC tag detection. Details will be described later with reference to a flowchart shown in FIG. 7. After that, the process advances to step 605, and the CPU 103 determines whether printing has ended. If printing has not ended, the process returns to step 602. On the other hand, if it is determined in step 602 that the number of NFC tags to be recorded has been detected, it is considered that all the pieces of information of the tags existing on the document have already been recorded in the NFC tags, thereby advancing to step 604. In step 604, the CPU 103 executes carriage conveyance control after tag detection. Details of step 604 will be explained with reference to FIG. 9. After that, the process advances to step 605 to determine whether printing has ended.

In step 605, the CPU 103 determines whether printing has ended. If printing has not ended, the process returns to step 602; otherwise, the process advances to step 606. Note that when it is determined in step 605 that printing of print data has ended, if the number of detected NFC tags is insufficient and a region where NFC tags are searched for still remains on the paper sheet, scanning of the print carriage 102 for searching for NFC tags may continue. With this processing, for example, even if print data corresponds to only half the paper sheet, a search for NFC tags is continued for a blank portion of the paper sheet, and it is possible to more reliably detect the necessary number of NFC tags irrespective of the printing range of the print data.

In step 606, the CPU 103 determines whether the number of writing tags (targets of writing processing) is equal to that of detected tags. The number of writing tags indicates the number of NFC tags arranged on a document when the reading unit 110 reads the document. This number can be interpreted as the number of NFC tags to be copied. In this embodiment, the number of NFC tags actually detected from the document is used. The present invention, however, is not limited to this. Any tag information to be written and any method of acquiring the number of NFC tags may be used. For example, tag information to be written and the number of tags may be input through the operation unit 109. An instruction may be received from an external apparatus (for example, a PC) connected to the MFP 100.

If it is determined in step 606 that the number of writing NFC tags is equal to that of detected tags, the process advances to step 610. On the other hand, if it is determined that the numbers of tags are not equal to each other, the process advances to step 607. Examples of a case in which it is determined in step 606 that the numbers of NFC tags are not equal to each other include a case in which the necessary number of NFC tags do not exist on the paper sheet, and a case in which an NFC tag itself exists but cannot be detected. Conversely, there is a case in which the number of detected NFC tags is larger than expected. This situation can occur by continuing NFC tag detection during conveyance of the print carriage 102 in step 603.

In step 607, the CPU 103 determines which of the number of detected tags and the number of tags existing on the document (the number of writing tags) is larger. If the number of detected tags is smaller than that of writing tags (the number of detected tags is insufficient), the process advances to step 609, and the CPU 103 executes tag information control when the number of writing tags is smaller. The processing in step 609 will be described in detail later with reference to FIG. 11. On the other hand, if the number of detected tags is larger than the number of writing tags (an excessive tag has been detected), the process advances to step 608, and the CPU 103 executes tag information control when the number of writing tags is larger. Details of step 608 will be described later with reference to FIG. 12.

The process advances to step 610 through steps 606, 608, and 609. In step 610, the CPU 103 confirms whether there is a tag in which information could not be correctly written at the time of a tag write operation. In this embodiment, if an operation of writing information in an NFC tag has failed, information indicating it is held in the RAM 105, as will be described in detail with reference to a flowchart shown in FIG. 8. Therefore, depending on whether such information is held in the RAM 105, it is possible to confirm whether there exists an NFC tag for which an information write operation has failed. If it is determined that there is no NFC tag for which a tag information write operation has failed, the process ends. On the other hand, if it is determined that there exists an NFC tag for which a tag information write operation has failed, the process advances to step 611. In step 611, the CPU 103 performs processing of presenting, to the user, tag information which could not be correctly written. Details will be described with reference to FIG. 10. Upon completion of step 611, the process ends.

With the above processing, it is possible to record information in the NFC tags on the paper sheet while executing printing by arranging the NFC unit 126 in the print carriage 102, and control the print carriage to quickly finish only printing after recording the information in the NFC tags. Note that in this embodiment, the MFP 100 copies a document including tag information. However, the arrangement is not limited to this, and it is also possible to obtain the effects of the process even if another method is used to acquire print data and tag information necessary for printing and perform printing.

Figure 7:
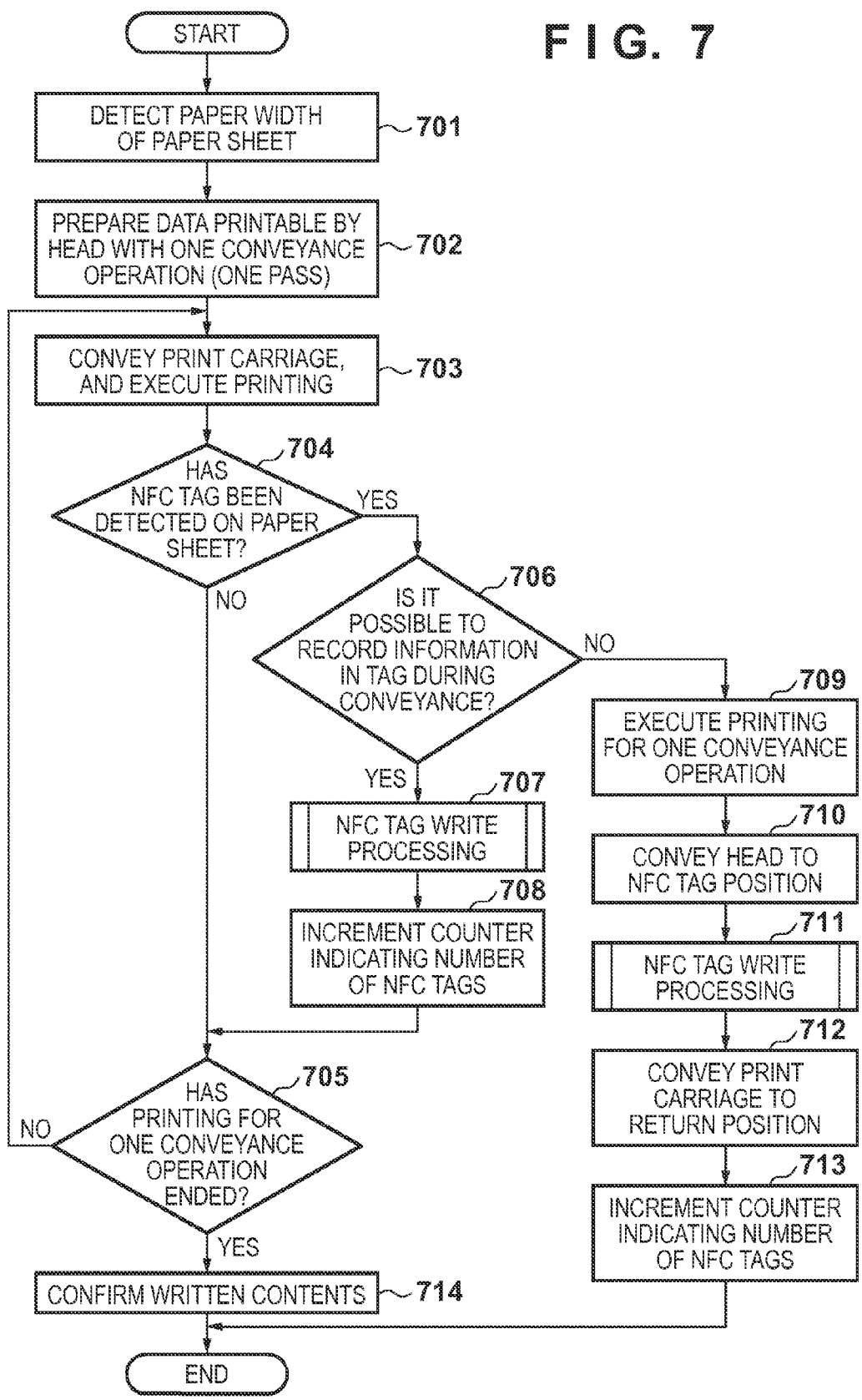
FIG. 7 is a flowchart illustrating print carriage conveyance control before detection of a necessary number of NFC tags.

FIG. 7 shows an example of print carriage conveyance control before NFC tag detection at the time of printing. According to the flowchart, since the print carriage 102 detects NFC tags while performing printing, it is scanned within a tag search range according to the paper width. Note that the flowchart shows details of the processing in step 603 of FIG. 6. Therefore, data to be printed in the processing shown in FIG. 7 corresponds to data for one conveyance operation of the print carriage 102, and this processing is repeatedly executed many times until an image is printed on the entire paper sheet.

In step 701, the CPU 103 detects the width of the paper sheet. In this embodiment, the paper feed unit 115 includes a paper width detection unit (not shown), and can detect the paper width. The CPU 103 uses the detection result of the paper feed unit 115. Note that the paper width detection unit of the paper feed unit 115 is used in this embodiment. The present invention, however, is not limited to this. Any arrangement which can acquire a value usable as a paper width can be adopted. Although the paper width is used as a search range in this embodiment, the present invention is not limited to this. A necessary and sufficient value for searching for NFC tags need only be acquired for the paper sheet.

In step 702, the CPU 103 supplies, to the printhead 118, data which can be printed by the printhead 118 with one conveyance operation (one pass). This indicates that data to be used in printing is prepared when conveying the print carriage 102 from left to right (or from right to left) at the time of printing. In step 703, the CPU 103 conveys the print carriage 102, and executes printing by the printhead 118. Upon start of conveyance of the print carriage 102, the CPU 103 determines whether the NFC unit 126 has detected an NFC tag on the print sheet during conveyance of the print carriage 102 (steps 704 and 705). That is, if it is determined in step 704 that no NFC tag has been detected, the process advances to step 705. In step 705, the CPU 103 determines whether printing for one conveyance operation has ended. If printing has not ended, the process returns to step 703 to perform conveyance and printing. In this way, the CPU 103 continuously monitors whether an NFC tag has been detected until printing for one conveyance operation ends.

If an NFC tag has been detected on the print sheet during conveyance of the print carriage 102, the process advances from step 704 to step 706. In step 706, the CPU 103 determines whether it is possible to record information in the detected NFC tag without changing the current print carriage conveyance operation. That is, it is determined whether it is possible to record information in the NFC tag during conveyance of the print carriage 102 for one-line printing. To record information in the NFC tag, it is necessary to keep communication established from the start to end of communication but the speed of the print carriage 102 generally changes depending on the current position and print mode. Therefore, for example, if the print carriage 102 is conveyed at a travelling speed, communication up to recording of the NFC tag may not be completed. On the other hand, if the print carriage 102 is conveyed at a lowest speed, it is possible to record information in the NFC tag while conveying the print carriage. In this embodiment, based on the current speed of the print carriage 102, it is determined whether it is possible to perform recording when the print carriage 102 passes through the NFC tag. Note that the method of determining whether tag recording is possible during conveyance of the print carriage is not limited to this. Any index can be used as long as it is possible to determine whether tag recording is possible during conveyance.

If it is determined in step 706 that tag recording is possible, the process advances to step 707, and the CPU 103 performs processing of writing information in the NFC tag on the paper sheet while conveying the print carriage 102. Details of the processing of writing the tag information in the NFC tag will be described with reference to FIG. 8. Upon completion of the write processing, the process advances to step 708. In step 708, a counter indicating the number of detected NFC tags is incremented by one. The counter is referred to when the number of detected NFC tags is acquired in step 602 described above. After that, the process advances to step 705. Upon completion of printing for one conveyance operation, the process advances from step 705 to step 714. In step 714, it is confirmed whether the tag information has been correctly written in the NFC tag in step 707. This processing will be described later with reference to FIG. 16. Note that if no information has been written in the NFC tag in the one conveyance operation, step 714 is skipped.

Note that as described above, in step 706 of this embodiment, it is determined based on the speed of the print carriage 102 whether it is possible to simultaneously perform printing and recording. The present invention, however, is not limited to this. For example, such determination can be made using the position of the print carriage 102. Since the print carriage 102 stops when conveyance starts or ends, it is conveyed at a low speed. Therefore, the print carriage is conveyed at a speed which causes no problem when communicating with the NFC tag. On the other hand, at the central position of the conveyance width, the print carriage is conveyed at a highest speed, and thus the speed may be too high to establish communication at the time of performing NFC communication. In this case, it is impossible to write information in the tag simultaneously with printing. As described above, based on the position of the print carriage 102, it can be determined whether it is possible to record information in the NFC tag. Note that the printhead control unit 117 can detect the position of the print carriage 102.

If it is determined in step 706 that recording of information in the NFC tag during conveyance of the print carriage 102 is impossible, the process advances to step 709, and the CPU 103 completes printing for one conveyance operation, which is currently executed. In step 710, the CPU 103 conveys the print carriage to the previously detected NFC tag position. In step 711, the CPU 103 performs processing of writing information in the NFC tag. The processing of writing the tag information in the NFC tag in step 711 is the same as that in step 707, and details thereof will be described later with reference to FIG. 8. In step 712, the CPU 103 conveys the print carriage 102 to its return position. For example, for 1-pass printing, the CPU 103 returns the print carriage 102 to its return position. For 2-pass printing, the CPU 103 returns the print carriage 102 to a position where backward printing starts.

After that, in step 713, the counter for counting the number of NFC tags is incremented by one. The counter is referred to when acquiring the number of detected NFC tags in step 602 described above. Note that during conveyance of the print carriage 102 continued in step 709, NFC tag detection may be continued. If a plurality of NFC tags are detected in one conveyance operation, tag information is recorded in each of the NFC tags in steps 710 and 711. In step 713, the counter is incremented by the number of detected NFC tags.

Figure 8:
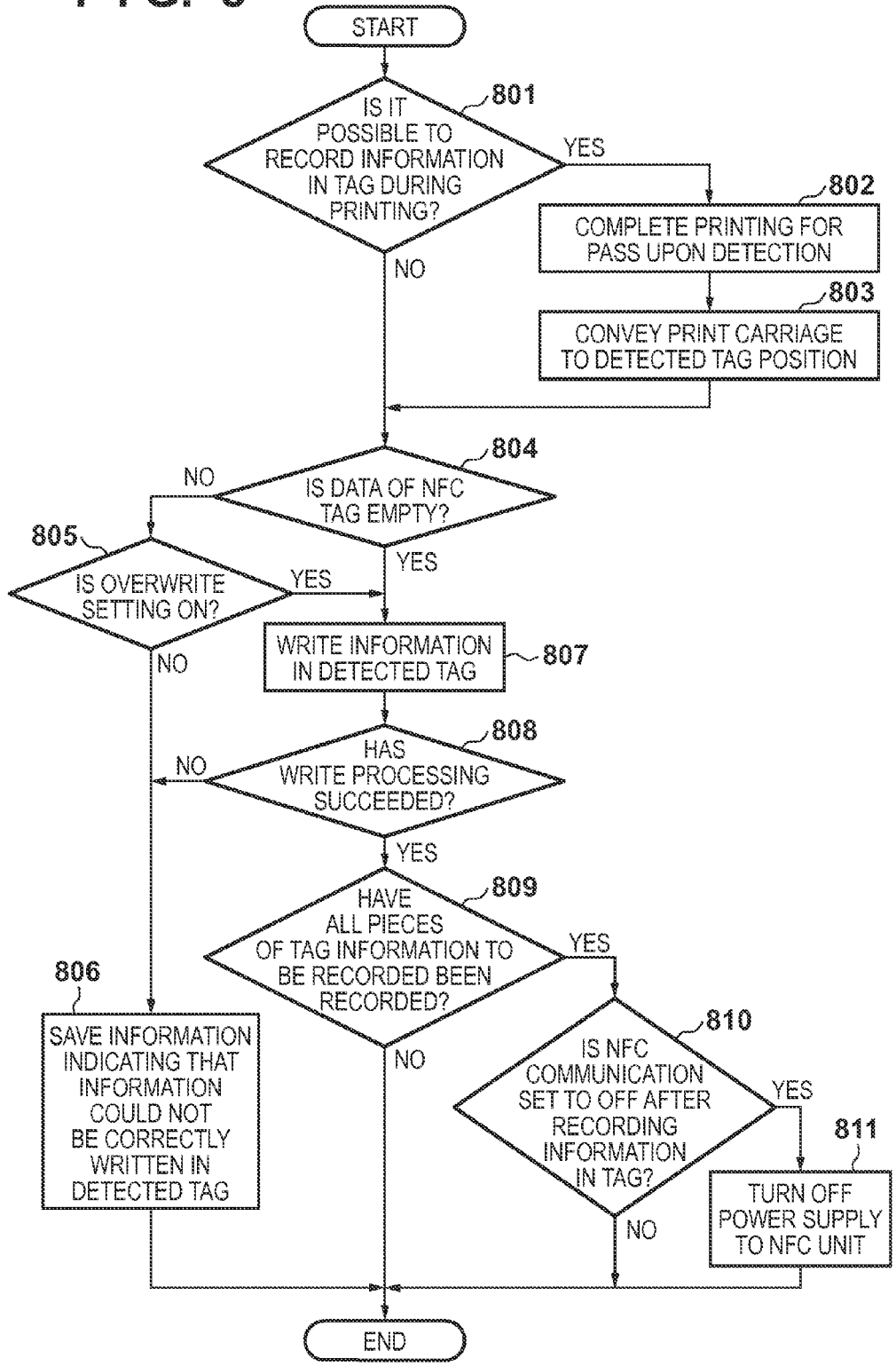
FIG. 8 is a flowchart illustrating processing of writing information in an NFC tag on a paper sheet.

FIG. 8 shows an example of the processing of writing tag information in the NFC tag on the paper sheet. The flowchart shows a method of recording information in the NFC tag on the paper sheet. In step 801, it is determined whether it is possible to record information in the tag while executing printing. Although determination of whether it is possible to record information in the NFC tag while executing printing is performed once in FIG. 7 (step 706), such determination is performed again immediately before write processing. With this operation, a double check can be made, thereby reducing errors in recording of the information in the NFC tag. Furthermore, the determination condition may be the same as that in step 706 of FIG. 7, or another condition may be used. In this embodiment, the same condition as that in step 706 of FIG. 7 is used.

If it is determined in step 801 that recording is possible, the process advances to step 804; otherwise, the process advances to step 802. In step 802, the CPU 103 completes printing for a pass for which a tag has been detected. This is because if printing is stopped to allow recording in the NFC tag, the print speed lowers and the print quality deteriorates. In step 803, the CPU 103 conveys the print carriage 102 to the position of the detected tag.

Processing in step 804 and subsequent steps is processing of recording information in the NFC tag on the paper sheet. In step 804, the CPU 103 determines whether data of the detected NFC tag is empty. Whether the data of the NFC tag is empty can be confirmed in communication in steps S504 and S505 of FIG. 5. If it is determined that the data is empty, the process advances to step 807 to record information in the detected tag. On the other hand, if it is determined in step 804 that the data of the NFC tag is not empty, the process advances to step 805. In step 805, the CPU 103 determines whether an overwrite setting indicating whether overwriting of the tag is allowed is ON. This setting can be made through the operation unit 109. If it is determined in step 805 that the overwrite setting is ON, the process advances to step 807 to overwrite the data of the NFC tag with information.

Figure 13A:
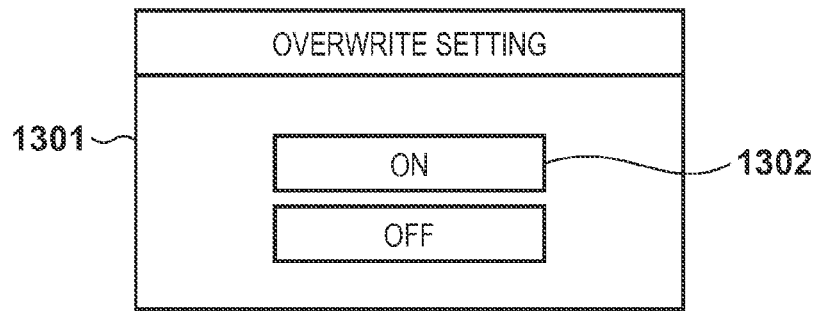
FIGS. 13A to 13D are views each showing an example of a setting screen for an operation panel.
Figure 13B:
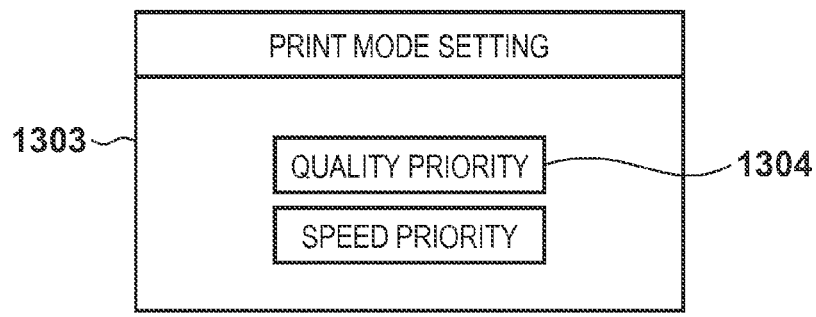

On the other hand, if it is determined in step 805 that the overwrite setting is not ON, the process advances to step 806, and the CPU 103 saves in, for example, the RAM 105 information indicating that the tag information could not be correctly written in the NFC tag detected in step 704, thereby terminating the process. At this time, a set of the tag information which could not be correctly written and information for specifying the NFC tag is recorded in the RAM 105. Note that the user can set the overwrite setting from a setting screen to be described later with reference to FIGS. 13A to 13D. For example, the overwrite setting may be directly set, as shown in FIG. 13A. Alternatively, as shown in FIG. 13B, if a print mode is "speed priority", the overwrite setting may be set to ON. If the print mode is "quality priority", the overwrite setting may be set to OFF.

After the information is written in step 807, the process advances to step 808. In step 808, the CPU 103 determines whether the tag information write processing has succeeded. If the processing has not succeeded, the process advances to step 806, and the CPU 103 saves in, for example, the RAM 105 information indicating that the tag information could not be correctly written. On the other hand, if it is determined in step 808 that the write processing has succeeded, the process advances to step 809. In step 809, the CPU 103 determines whether all pieces of tag information to be recorded have been recorded. If tag information to be recorded still remains, the process ends. On the other hand, if all the pieces of tag information to be recorded have been recorded, the process advances to step 810.

In step 810, the CPU 103 determines whether the mode is a mode in which NFC communication is set to OFF after recording all the pieces of information in the NFC tags. By setting NFC communication to OFF after all the pieces of tag information to be recorded are recorded on the paper sheet, it is possible to avoid unnecessary communication in NFC communication. If it is determined in step 810 that the mode is not a mode in which NFC communication is set to OFF, the process ends without performing any processing. On the other hand, if it is determined in step 810 that the mode in which NFC communication is set to OFF has been set, the process advances to step 811. In step 811, power supply to the NFC unit is stopped. This operation disables communication of the NFC unit in subsequent printing, thereby controlling to prevent unnecessary communication from being performed. If, for example, the print mode shown in FIG. 13B is "speed priority", the NFC communication off mode is set to ON. Therefore, the process advances to step 811 to turn off power supply to the NFC unit.

By executing the above processing, it is possible to determine whether it is possible to record information in the NFC tag while executing printing, and appropriately write the information in the NFC tag according to the determination result. Note that in this embodiment, the speed or position has been exemplified as a condition under which it is determined whether it is possible to record information in the NFC tag. The present invention, however, is not limited to this, and any information for determining whether it is possible to simultaneously perform printing and information recording may be used.

Note that recorded tag information may be confirmed during conveyance when returning the print carriage 102 in 1-pass printing or during backward conveyance in 2-pass printing. That is, in the reciprocating conveyance operation of the print carriage 102, whether detection of an NFC tag and writing of tag information, which have been performed during forward conveyance of the print carriage 102, have succeeded may be confirmed during backward conveyance of the print carriage 102. Such confirmation processing will be described below with reference to a flowchart shown in FIG. 16. Note that the processing shown in FIG. 16 is performed, for example, immediately after determining "YES" in step 705.

In step 1601, the CPU 103 determines whether to perform the processing of confirming the information written in the NFC tag on the paper sheet. The user can set whether to perform the confirmation processing, and an example of a setting screen for this operation will be described later with reference to FIGS. 13A to 13D. If it is determined in step 1601 that no confirmation processing is to be performed, the process ends. On the other hand, if it is determined in step 1601 that the confirmation processing is to be performed, the process advances to step 1602. Note that, for example, if the print mode to be described later with reference to FIG. 13B is "quality priority", a setting for performing the confirmation processing is set to ON. If the print mode is "speed priority", the setting for performing the confirmation processing is set to OFF.

In step 1602, the CPU 103 conveys the print carriage 102 to the position of the NFC tag which has been detected and undergone write processing. At this time, if the conveyance operation is backward conveyance of 2-pass printing, printing is also executed. Since the print carriage is conveyed to a position where it is possible to communicate with the NFC tag, tag information is acquired in step 1603. It is determined in step 1604 whether the tag information written by the apparatus in advance is the same as that acquired in step 1603. If the pieces of information are the same, the process advances to step 1606, and the remaining print data is printed while conveying the print carriage. On the other hand, if it is determined in step 1604 that the pieces of tag information are not the same, information is rewritten in the NFC tag again in step 1605. Then, the process advances to step 1606, and the remaining print data is printed while conveying the print carriage. Note that in the case of unidirectional 1-pass printing, only print carriage conveyance is performed without executing printing in steps 1602 and 1606.

As described above, this confirmation processing can confirm whether the written tag information is correct or not, and control to execute printing. Furthermore, if the data is wrong, it can be corrected to correct data.

Figure 9:
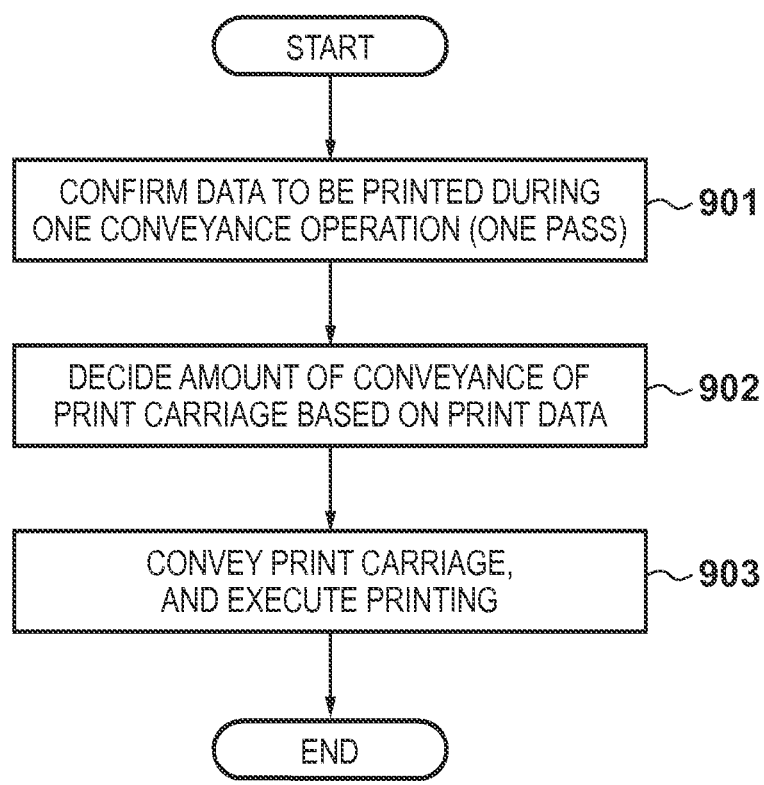
FIG. 9 is a flowchart illustrating print carriage conveyance control after detection of the necessary number of NFC tags.

FIG. 9 shows an example of print carriage conveyance control after the NFC tag is detected at the time of printing and then it becomes unnecessary to record information in a tag. This processing is executed in step 604 of FIG. 6. The processing shown in the flowchart of FIG. 9 is basically the same as a print operation when the print carriage 102 includes no NFC unit 126. In step 901, data to be printed during one conveyance operation (one pass) of the print carriage 102 is confirmed. In step 902, an amount of conveyance of the print carriage is decided based on the print data. This is done because an amount of conveyance of the print carriage 102 is decided based on the amount of an image to be printed after tag detection, as shown in FIGS. 3A and 3B. After that, the process advances to step 903, and the CPU 103 executes printing by conveying the print carriage 102 according to the data to be printed, thereby terminating the process.

Figure 10:
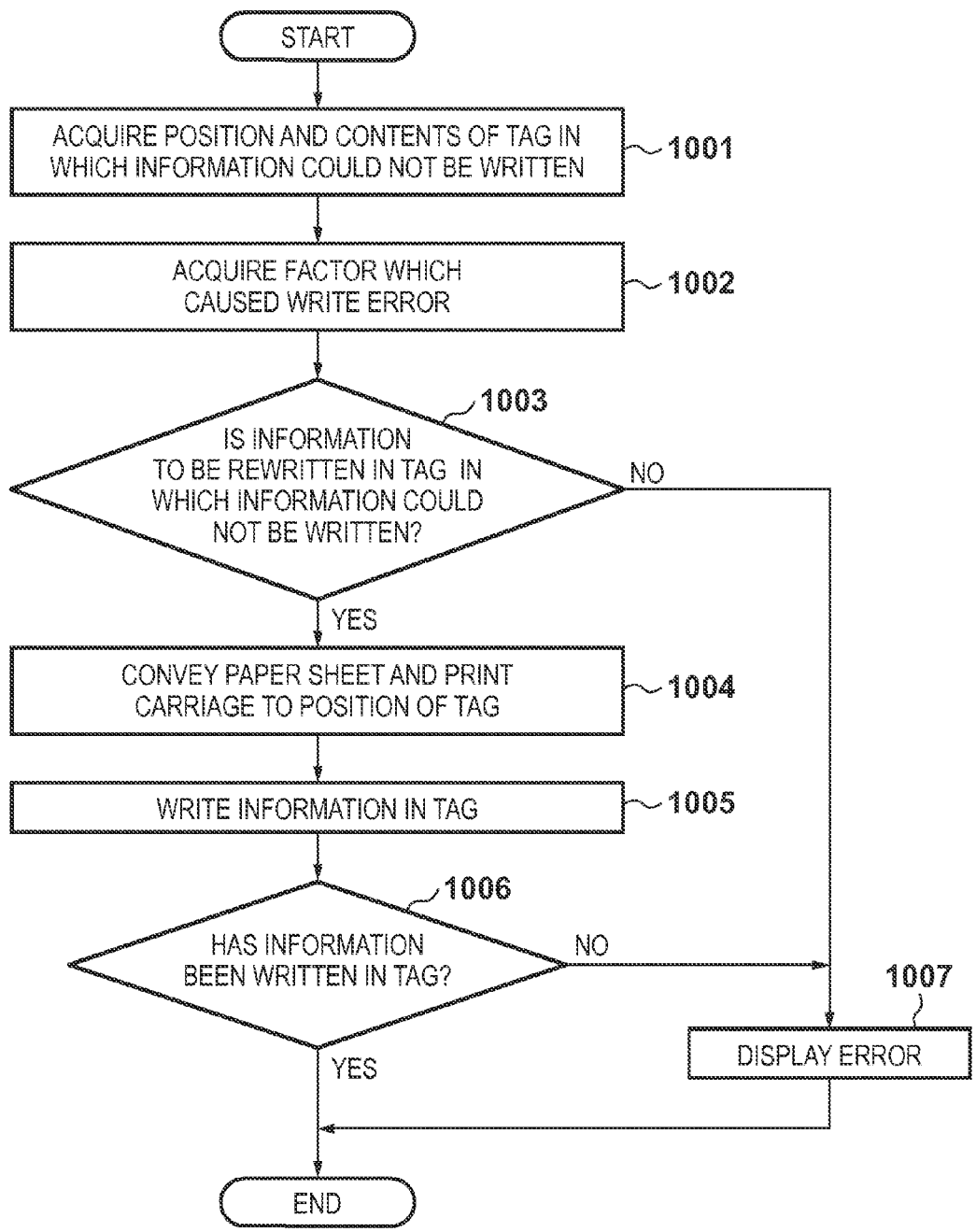
FIG. 10 is a flowchart illustrating tag processing after printing.

FIG. 10 shows an example of tag processing when information could not be correctly written in a tag after printing. In step 806 of FIG. 8, control to save data is executed when information could not be correctly written in the NFC tag. FIG. 10 shows a procedure of re-recording the information in the NFC tag using the data saved in the control operation when the information could not be correctly written in the NFC tag after printing. As described above, if the information could not be recorded in the NFC tag at the time of printing for some reason, it is possible to reduce errors in recording of information in the NFC tag by controlling to record the tag information in the NFC tag after printing.

In step 1001, the CPU 103 acquires the position and contents of the tag in which the information could not be written. In step 1002, the CPU 103 acquires a factor which caused the write error. In step 1003, the CPU 103 determines whether to rewrite the information in the tag in which the information could not be written. The user can set whether to rewrite the information. If rewrite processing is not to be performed, the process advances to step 1007, and an error is displayed on the display unit 111. Error contents including the factor detected in step 1002 are displayed. For example, if the tag information could not be recorded due to overwrite protection, information indicating it can be displayed, thereby prompting the user to perform processing of, for example, canceling overwrite protection.

On the other hand, if it is determined in step 1003 that rewrite processing is to be performed, the process advances to step 1004, and the CPU 103 conveys the paper sheet and the print carriage to the position of the NFC tag in which the information could not be written. In step 1005, the CPU 103 writes the information in the NFC tag. In this way, it is possible to re-record the information in the NFC tag in which the information could not be correctly written. In step 1006, the CPU 103 determines whether the information could be correctly written in the NFC tag in the information write processing in step 1005. If the information could not be written in the tag, the process advances to step 1007, and the CPU 103 displays an error on the display unit 111; otherwise, the process ends.

Figure 11:
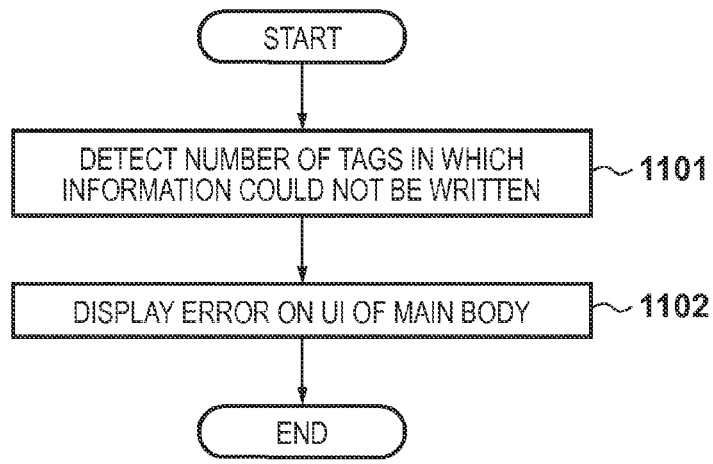
FIG. 11 is a flowchart illustrating an operation when the necessary number of tags cannot be found on a paper sheet.

FIG. 11 is a flowchart illustrating processing when the necessary number of NFC tags cannot be found from the paper sheet. FIG. 11 shows a detailed procedure in step 609 of FIG. 6. When recording tag information in the paper sheet, tags which are writable on the paper sheet and the number of which is equal to that of pieces of tag information prepared for recording are required. However, detection may fail, or no tag may exist on the paper sheet. In this case, the procedure executes error display control.

In step 1101, the CPU 103 acquires the number of tags in which the information could not be written ([number of writing tags]−[number of detected tags]). In step 1102, the information acquired in step 1101 is displayed as an error on the display unit 111 serving as the user interface of the main body. If the number of detected NFC tags does not reach the number of NFC tags to undergo write processing even after completion of conveyance of the print carriage over the entire paper sheet, this is warned. After that, the process ends.

In the processing shown in FIG. 11, only error display is performed. Since re-recording is performed when recording of tag information fails in FIG. 10 or 9, the apparatus considers that there is no way of dealing with the problem, and error display is performed in this procedure. With this processing, if the tag information could not be recorded on the paper sheet, it is possible to notify the user of the reason (for example, the number of detected tags is insufficient, or data could not be written in the tag). Especially for the tag information, the user cannot check with the naked eye whether recording in the NFC tag has been successfully performed. It is also difficult to manually check the results one by one. To solve these problems, error display is provided in the printing apparatus in advance. If recording of tag information fails, control to indicate the information which has failed to be recorded is performed, thereby providing the printing apparatus with high usability.

Figure 12:
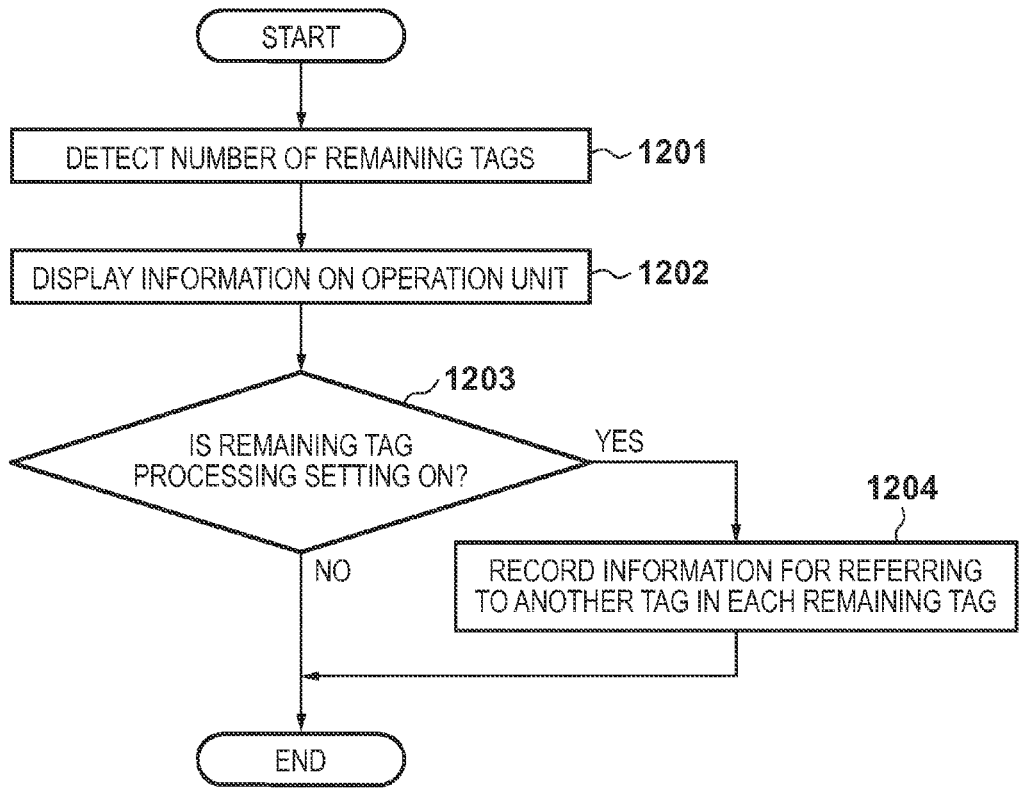
FIG. 12 is a flowchart illustrating an operation when the necessary number or more of tags can be found on a paper sheet.

FIG. 12 shows an example of a behavior when the necessary number or more of tags to be recorded can be found on the paper sheet. As described above, FIG. 12 shows a detailed procedure in step 608 of FIG. 6. With this procedure, if tags the number of which is larger than that of tags to be recorded at the time of printing exist on the paper sheet, it is possible to record, in a tag, information indicating that another tag should be referred to.

In step 1201, the CPU 103 detects the number of remaining NFC tags which have not been used for recording when performing printing and recording in tags on the paper sheet. In step 1202, the CPU 103 displays, on the display unit 111, the number of remaining NFC tags which has been detected in step 1201. In step 1203, the CPU 103 determines whether setting has been made to write information in the remaining tags. If no setting has been made to write information, the process ends.

On the other hand, if setting has been made to write information, the process advances to step 1204. In step 1204, information indicating that a correctly recorded tag should be referred to is recorded in each of the remaining tags. The information to be recorded is information pertaining to another tag on the paper sheet, and includes, for example, data indicating that there is necessary information in another tag, information about the position of the tag to be referred to on the paper sheet, and a direction with respect to the currently detected tag in which the tag to be referred to exists. Upon the end of step 1204, the process ends. With the above processing, if tags the number of which is larger than that of tags to be recorded at the time of printing exist on the paper sheet, it is possible to record, in each tag, information indicating that another tag should be referred to.

FIGS. 13A to 13D each show an example of a screen for setting a setting value settable through an operation panel. As described above, in some control procedures, control processing is changed according to the state of user settings made from a setting screen. It is possible to manipulate the setting values through the operation unit 109, and display them on the display unit 111. Practical examples of the display screens will be described in this embodiment.

Figure 13C:
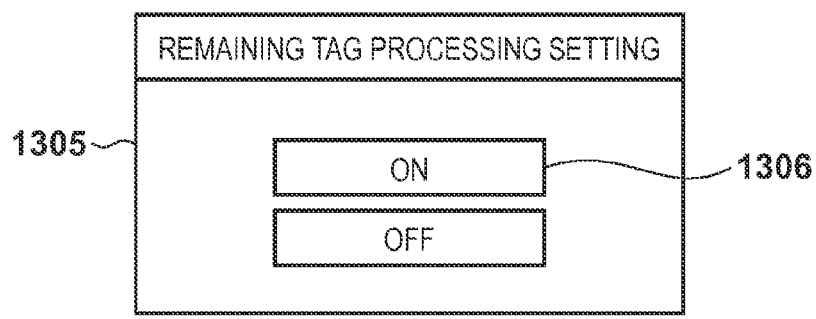
Figure 13D:
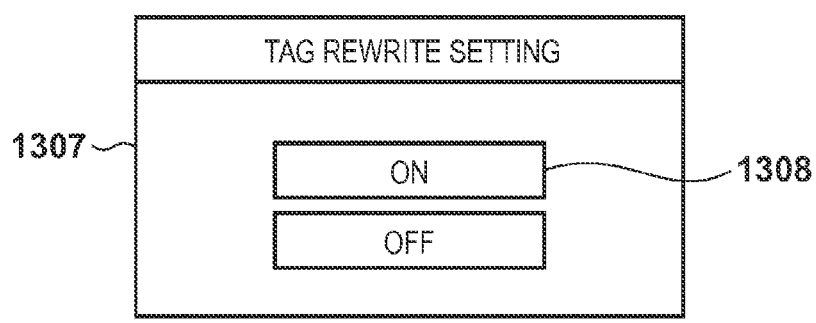

FIG. 13A shows a setting screen 1301 for setting whether to overwrite information in an NFC tag. In the setting screen 1301, reference numeral 1302 denotes setting items (whether to overwrite information, that is, "ON" or "OFF"). FIG. 13B shows a print mode setting screen 1303. Reference numeral 1304 denotes setting items (whether the print mode is "quality priority" or "speed priority"). FIG. 13C shows a setting screen 1305 for setting whether to perform processing for the remaining tags. In the setting screen 1305, reference numeral 1306 denotes setting items (whether to execute processing for the remaining tags, that is, "ON" or "OFF"). FIG. 13D shows a tag rewrite setting screen 1307. Setting items 1308 can be used to set whether to execute tag rewrite processing, that is, "ON" or "OFF".

Note that in this embodiment, in the print mode setting screen 1303 shown in FIG. 13B, the two items of "quality priority" and "speed priority" are implemented for a print mode setting. This can also be used in, for example, step 810 of FIG. 8 and step 1601 of FIG. 16. In step 810 of FIG. 8, if "quality priority" is set, the NFC communication off mode is invalid, and if "speed priority" is set, the NFC communication off mode is valid. With respect to the setting value for performing the confirmation procedure in step 1601 of FIG. 16, the setting value for performing the tag confirmation procedure is valid for "quality priority", and is invalid for "speed priority". In this embodiment, as described above, there is a setting value which influences on a plurality of procedures.

The setting screen 1305 and the setting items 1306 are provided for the setting value indicating whether to perform processing for the remaining tags. The setting screen 1307 and the setting items 1308 are provided for the setting value for setting whether to execute tag rewrite processing.

Figure 14A:
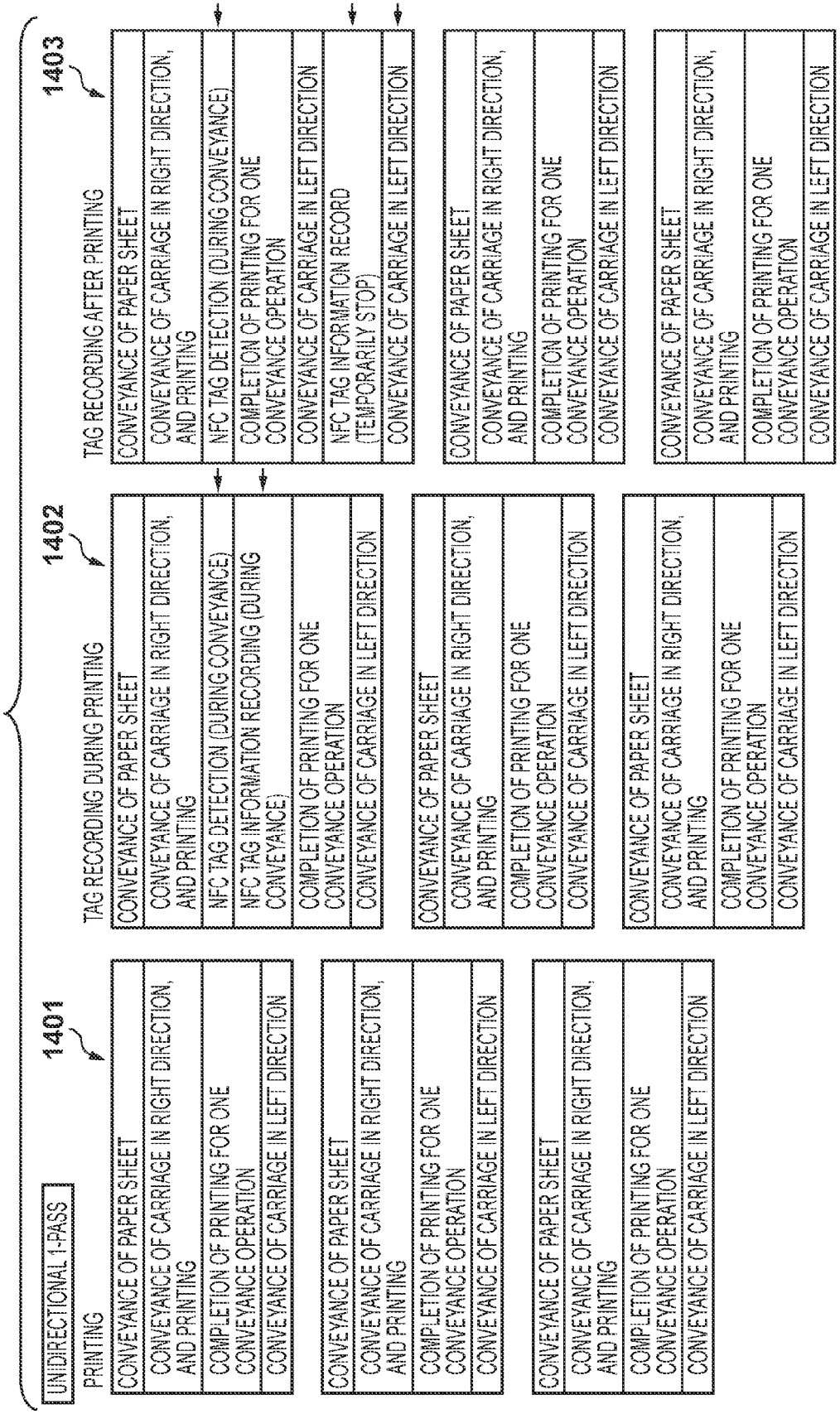
Figure 14B:
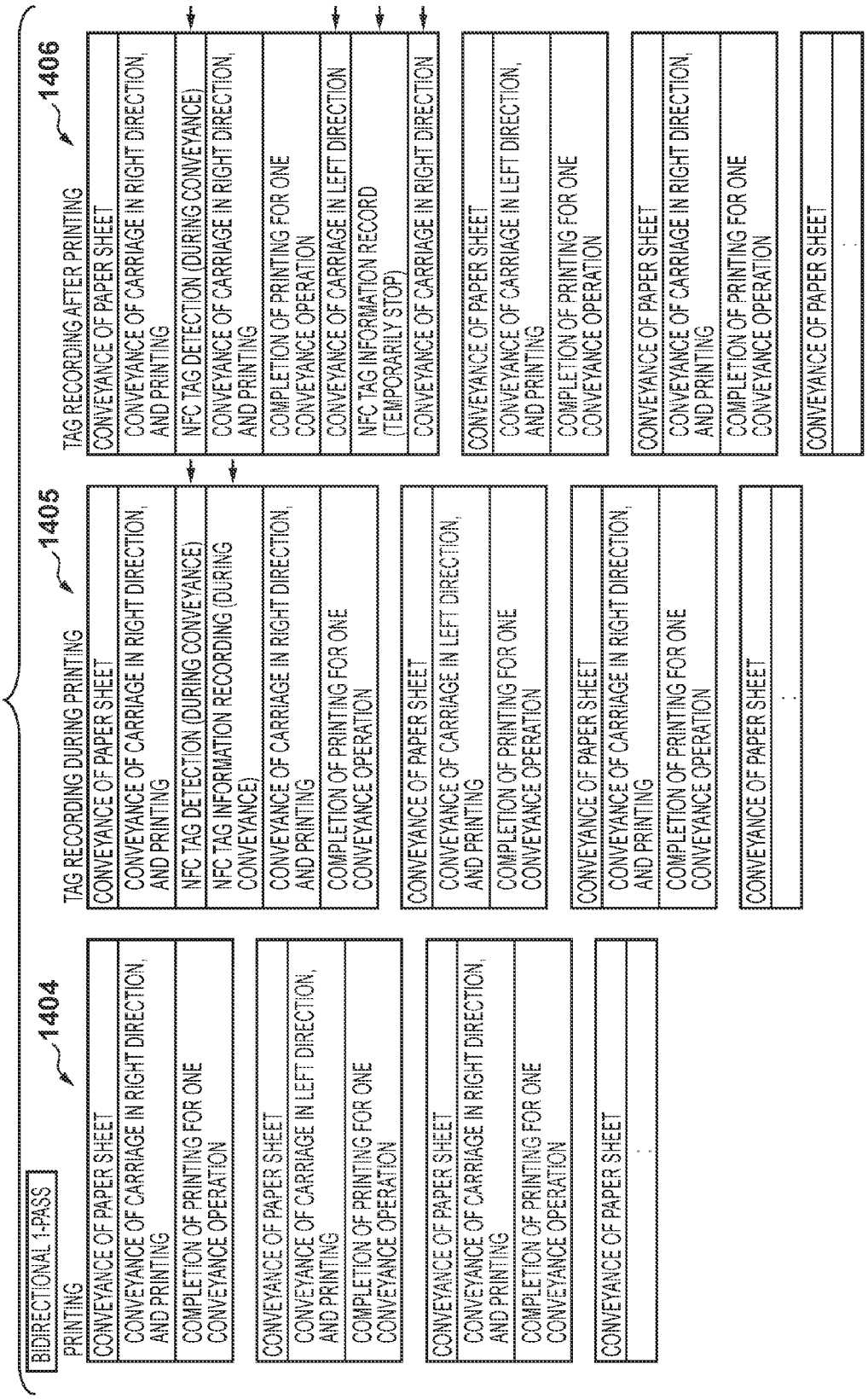

FIGS. 14A to 14C show an image of print carriage conveyance and conveyance control for tag detection according to this embodiment. FIGS. 14A to 14C show an image indicating, in detail, how the print carriage 102 is conveyed. Note that the conveyance direction of the print carriage 102 shown in FIGS. 14A to 14C is based on FIGS. 3A and 3B. Therefore, the print carriage 102 is conveyed in the lateral direction, and the paper sheet is conveyed in the vertical direction. Note that a direction in which the paper sheet is conveyed downward is defined as a forward direction when printing the paper sheet.

In 1401 to 1403, examples of unidirectional 1-pass printing in which print processing is performed only when the print carriage is conveyed in one direction are shown. In 1401, normal unidirectional 1-pass printing is shown. In 1402, a case is shown in which upon detecting an NFC tag, information is recorded in the NFC tag while executing printing. In 1403, a case is shown in which after executing printing upon detecting an NFC tag, and then executing printing for the pass, information is recorded in the NFC tag.

In 1404, bidirectional 1-pass printing is shown in which, when executing printing, printing is executed once during each conveyance operation of the print carriage. More specifically, printing is executed once when conveying the print carriage in the right direction. At this time, printing is completed for one conveyance operation of the paper sheet. After that, the paper sheet is conveyed, and printing is executed once when conveying the print carriage in the left direction. In 1405, a case is shown in which in bidirectional 1-pass printing, upon detecting an NFC tag, information is recorded in the NFC tag while executing printing. In 1406, a case is shown in which in bidirectional 1-pass printing, printing for the pass is executed upon detecting an NFC tag and information is then recorded in the NFC tag.

In 1407, bidirectional 2-pass printing is shown in which, when executing printing, printing is executed once in each direction during reciprocating conveyance of the print carriage. More specifically, printing is executed once when conveying the print carriage in the right direction, and printing is executed once when conveying the print carriage in the left direction, thereby completing printing of a region to be printed. In 1408, a case is shown in which in bidirectional 2-pass printing, upon detecting an NFC tag, information is recorded in the NFC tag while executing printing. In 1409, a case is shown in which in bidirectional 2-pass printing, printing for the pass is executed upon detecting an NFC tag, and information is then recorded in the NFC tag.

A way of understanding FIGS. 14A to 14C will be explained with reference to 1401. In 1401, behaviors at the time of printing are shown from the top. The paper sheet is conveyed first. The print carriage in conveyed in the right direction and printing is executed. Printing for one conveyance operation is completed. After that, the print carriage is conveyed in the left direction, thereby advancing to the next print start position. It is possible to execute printing by repeating this processing. In 1402 to 1409, behaviors are described in the same format. In 1402, 1405, or 1408, a procedure of recording information in an NFC tag while conveying the print carriage during printing is shown. Furthermore, in 1403, 1406, or 1409, a procedure of conveying the print carriage to record information in the NFC tag and recording the information after printing is completed once is shown. As described above, in this embodiment, conveyance of the print carriage 102, printing, and recording of information in the NFC tag are controlled.

Figure 15:
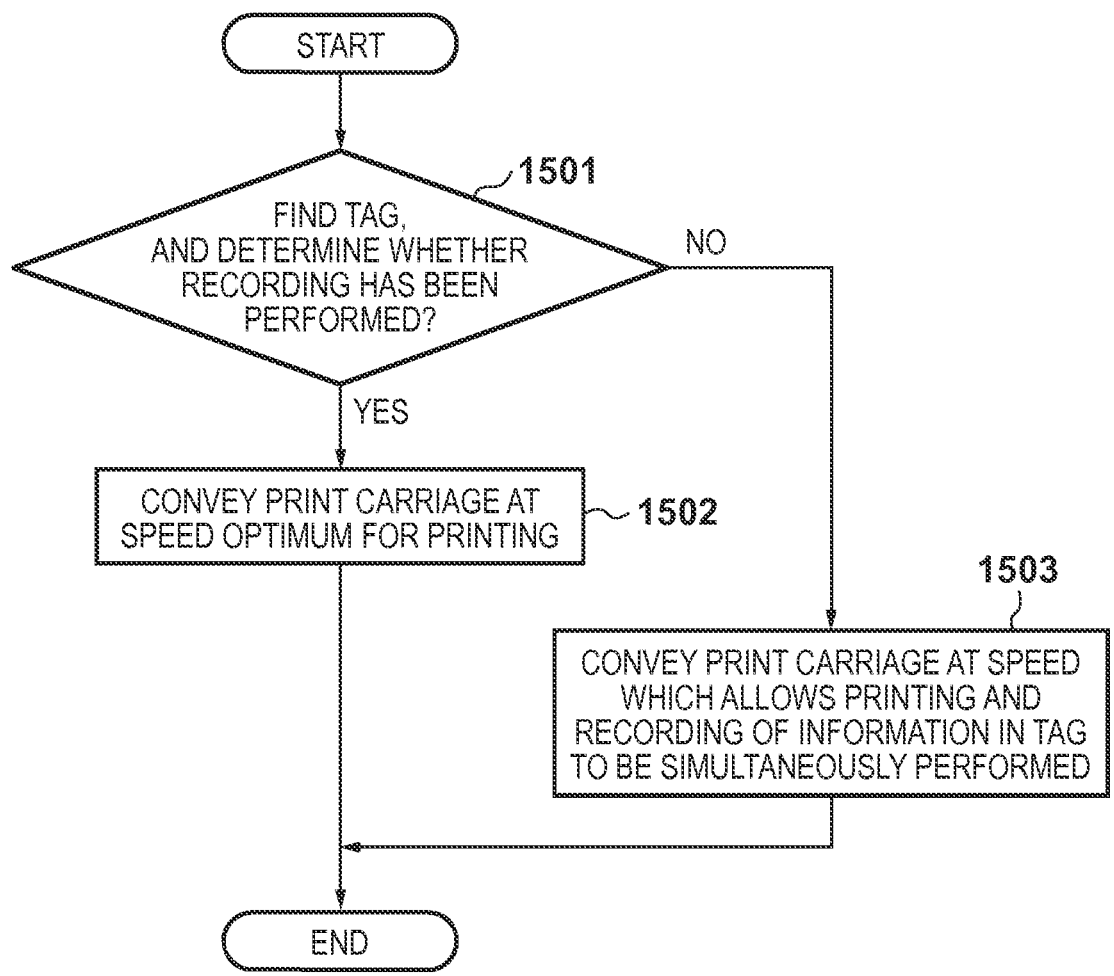
FIG. 15 is a flowchart illustrating processing of changing the print carriage conveyance speed.

Note that in the above-described embodiment, if the conveyance speed of the print carriage 102 is too high to write information in an NFC tag, the tag information is written by returning the print carriage 102 to the position of the NFC tag after completion of currently executing printing for a pass. However, control for writing the tag information is not limited to this. For example, the print carriage 102 may be conveyed at a speed which allows writing of the tag information before all pieces of tag information are written in NFC tags, and the print carriage 102 may be conveyed at a speed appropriate for printing after all the pieces of tag information are written. FIG. 15 shows an example of control of the print carriage conveyance speed according to the above embodiment. In general, the print carriage 102 is conveyed at a speed optimum for printing. In this embodiment, however, it is possible to execute more effective control when printing a document and recording information in an NFC tag in the embodiment by executing control while switching between a conveyance speed optimum for printing and a speed which allows recording of information in an NFC tag.

In step 1501, the CPU 103 detects an NFC tag on a paper sheet to be printed, and determines whether information has been recorded in the tag. This determination indicates not determination of whether one or more tags have undergone recording processing but determination of whether all the tags to undergo recording processing have undergone recording processing. It is determined whether all pieces of tag information to be recorded on the paper sheet have been recorded. If it is determined that all the pieces of information have been recorded, the process advances to step 1502, and the CPU 103 controls to convey the print carriage 102 at a speed optimum for printing. The process then ends. On the other hand, if it is determined that not all the pieces of information have been recorded in the tags, the process advances to step 1503, and the CPU 103 conveys the print carriage 102 at a speed which allows printing and recording of information in the tag to be simultaneously performed. The process then ends.

Such control processing can control the print carriage so as to simultaneously perform printing and recording of information in the NFC tag before all the pieces of information are written in the tags, and convey the print carriage so as to efficiently complete printing after all the pieces of information are recorded.

With the above-described method, it is possible to record information in a tag while executing printing when printing a paper sheet with tags capable of recording information by arranging a close proximity communication unit in the print carriage. As a result, even if a document to be copied includes a tag such as an NFC tag which records readable information, it is possible to copy the document by reading the image data and tag information of the document, and then printing the image data and recording the information.

Note that in this embodiment, an NFC unit is used as a short distance wireless communication unit to record information in a tag on a paper sheet. The present invention, however, is not limited to this, and any method which can be implemented by the similar arrangement may be used. This embodiment shows an example in which an original document with a tag such as an NFC tag that records information is set as a copy target, and information is recorded when the printing apparatus executes printing. However, in another use case in which information of a tag is recorded in addition to printing of an image on a paper sheet, the printing apparatus of this embodiment can prepare necessary tag information, and then execute printing and record the information in the tag in the same manner. A method of acquiring document information to be created is not limited to that described in this embodiment.

Furthermore, FIG. 16 shows a case in which in the reciprocating conveyance operation of the print carriage 102, whether detection of an NFC tag and writing of tag information, which have been performed during forward conveyance of the print carriage 102, have succeeded is confirmed during backward conveyance of the print carriage 102. The present invention, however, is not limited to this. For example, at the time of executing double-sided printing, whether writing of tag information in an NFC tag which has been executed at the time of printing the obverse surface has succeeded may be confirmed at the time of printing the reverse surface.

FIG. 12 shows a case in which information indicating that another tag should be referred to is recorded in a detected excessive NFC tag. The use of the excessive NFC tag is not limited to this. For example, if information indicating that write processing has failed is held in the RAM 105, tag information which has failed to be written may be recorded in the excessive NFC tag.

In the above embodiment, when the number of detected wireless tags reaches that of wireless tags in which tag information should be written, the conveyance mode of the print carriage 102 is changed. The present invention, however, is not limited to this. For example, the conveyance mode of the print carriage 102 may be changed using, as a trigger, the timing when no tag information to be written, that is, no unwritten tag information remains.

As described above, according to the aforementioned embodiment, when conveying the print carriage 102 to execute printing, it is possible to detect a wireless tag for short distance wireless communication on a paper sheet and record tag information in the wireless tag by additionally using short distance wireless communication. When a medium for short distance wireless communication is found, it is possible to perform operations such as a write operation and read operation for the medium while executing printing. It is also possible to smoothly perform a print operation by switching to control of executing only printing after detecting a necessary number of wireless tags, thereby maintaining the print speed. In addition, it is not necessary to incorporate a plurality of NFC units, and a wireless tag can be freely arranged on a paper sheet.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

Furthermore, a computer may execute a program code or hardware such as a circuit for implementing the function of the program code may be provided. Alternatively, some of the program codes may be implemented by hardware and the remaining part may be executed by the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-137480, filed Jun. 28, 2013 which is hereby incorporated by reference herein in its entirety.

What is claimed is:

1. A printing apparatus comprising:
a print carriage incorporating a printhead and a communication unit configured to perform short distance wireless communication;
a movement control unit configured to move said print carriage;
a detection unit configured to detect, when said movement control unit moves said print carriage to cause said printhead to execute printing of print data, a wireless tag on a paper sheet using said communication unit; and
a write unit configured to write tag information in the wireless tag detected by said detection unit,
wherein the movement control unit moves said print carriage to scan a width corresponding to a wireless tag search range on the paper sheet before a number of wireless tags detected by said detection unit reaches a number of target wireless tags which are targets of write processing by said write unit, and moves said print carriage to scan a width corresponding to a printing range of the print data after the number of wireless tags detected by said detection unit reaches the number of target wireless tags.

2. The apparatus according to claim 1, wherein said movement control unit moves said print carriage at a first speed before the number of wireless tags detected by said detection unit reaches the number of target wireless tags, and moves said print carriage at a second speed higher than the first speed after the number of wireless tags detected by said detection unit reaches the number of target wireless tags.

3. The apparatus according to claim 1, further comprising a warning unit configured to give a warning if the number of wireless tags detected by said detection unit does not reach the number of target wireless tags even after moving said print carriage over the entire paper sheet.

4. The apparatus according to claim 1, wherein upon completion of the printing, if said detection unit detects wireless tags the number of which is larger than the number of target wireless tags, information for referring to another wireless tag is written in an excessive wireless tag.

5. The apparatus according to claim 4, wherein the information for referring to the other wireless tag includes information about a position of the other wireless tag.

6. The apparatus according to claim 1, further comprising a holding unit configured to hold tag information which has failed to be written by said write unit, and information for specifying the wireless tag, and
a unit configured to rewrite, upon completion of printing of the print data, the tag information held in said holding unit in the wireless tag specified by the information.

7. The apparatus according to claim 1, further comprising a confirmation unit configured to, in reciprocating movement of said print carriage by said movement control unit to execute printing of the print data, confirm during backward movement whether write processing for a wireless tag which has been executed during forward movement of said print carriage has succeeded.

8. The apparatus according to claim 7, wherein if the write processing for the wireless tag which has been performed during forward movement has failed, said confirmation unit rewrites the tag information in the wireless tag.

9. The apparatus according to claim 1, further comprising a stop unit configured to stop power supply to said communication unit when the number of wireless tags detected by said detection unit reaches the number of target wireless tags.

10. The apparatus according to claim 1, wherein
said write unit
determines whether it is possible to write tag information in the wireless tag detected by said detection unit during movement of said print carriage for one-line printing,
writes, when it is determined that it is possible to write the tag information, the tag information in the detected wireless tag during the movement, and
writes, when it is determined that it is impossible to write the tag information, the tag information by moving said print carriage to a position of the detected wireless tag upon completion of movement for one line.

11. The apparatus according to claim 10, wherein the determination of whether it is possible to write the tag information is performed based on at least one of the current moving speed of said print carriage, the current position, and a set print mode.

12. The apparatus according to claim 1, wherein upon completion of the printing, if said detection unit detects wireless tags the number of which is larger than the number of target wireless tags, tag information which has failed to be written is written in an excessive wireless tag.

13. The apparatus according to claim 1, further comprising a unit configured to confirm, at the time of printing a reverse surface, whether processing of writing tag information in a wireless tag which has been executed by said write unit at the time of printing an obverse surface.

14. The apparatus according to claim 1, further comprising,
a paper width detection unit configured to detect a width of the paper sheet,
wherein the wireless tag search range is based on the width detected by the paper width detection unit.

15. The apparatus according to claim 1, further comprising,
a reading unit configured to read an original, and to acquire a read image of the original and tag information from a wireless tag on the original,
wherein said printhead executes printing of the read image acquired by the reading unit, and the write unit writes tag information acquired by the reading unit in the wireless tag detected by the detection unit.

16. The apparatus according to claim 15, wherein the reading unit further acquires a number of wireless tags on the original,
and wherein the number of target wireless tags which are targets of write processing by said write unit, is the number of wireless tags acquired by the reading unit.

17. A control method for a printing apparatus which includes a print carriage incorporating a printhead and a communication unit configured to perform short distance wireless communication, and a movement control unit configured to move the print carriage, the method comprising:
a detection step of detecting, when the movement control unit moves the print carriage to cause the printhead to execute printing of print data, a wireless tag on a paper sheet using the communication unit; and
a write step of writing tag information in the wireless tag detected in the detection step;
wherein the movement control unit moves the print carriage to scan a width corresponding to a wireless tag search range on the paper sheet before a number of wireless tags detected in the detection step reaches a number of wireless tags which are targets of write processing in the write step, and moves the print carriage to scan a width corresponding to a printing range of the print data after the number of wireless tags detected in the detection step reaches the number of target wireless tags.

18. A non-transitory computer-readable storage medium storing a program for causing a computer to execute each step of a control method according to claim 17.

* * * * *